United States Patent
Lemons et al.

(10) Patent No.: US 10,810,688 B1
(45) Date of Patent: Oct. 20, 2020

(54) DETERMINATION OF REFINED OILFIELD WATER DISPOSAL LOCATIONS BASED ON LEGAL NOTIFICATIONS

(71) Applicant: SOURCEWATER, INC., Houston, TX (US)

(72) Inventors: Casee Ryanne Lemons, Houston, TX (US); Victor Belous, Houston, TX (US); Daniel Rodney Wallin, Rosenberg, TX (US); Joshua Adler, Houston, TX (US); William P. Mallary, Seabrook, TX (US)

(73) Assignee: SOURCEWATER, INC., Houston, TX (US)

( * ) Notice: Subject to any disclaimer, the term of this patent is extended or adjusted under 35 U.S.C. 154(b) by 0 days.

(21) Appl. No.: 16/670,080

(22) Filed: Oct. 31, 2019

Related U.S. Application Data

(60) Provisional application No. 62/883,517, filed on Aug. 6, 2019.

(51) Int. Cl.
  *G06Q 50/02* (2012.01)
  *G06Q 10/06* (2012.01)
  (Continued)

(52) U.S. Cl.
  CPC ......... *G06Q 50/02* (2013.01); *G06K 9/00449* (2013.01); *G06Q 10/0637* (2013.01);
  (Continued)

(58) Field of Classification Search
  CPC ......... G06Q 10/06315; G06Q 10/0637; G06Q 50/02; G06F 40/205; G06T 9/00449; G06T 11/60; G06K 11/60
  See application file for complete search history.

(56) References Cited

U.S. PATENT DOCUMENTS

| | | | |
|---|---|---|---|
| 7,031,838 B1 * | 4/2006 | Young | G06Q 10/06 702/2 |
| 7,529,850 B2 * | 5/2009 | Verma | G06Q 10/10 709/242 |

(Continued)

OTHER PUBLICATIONS

The Public GIS Viewer allows users to view oil, gas and pipeline data in a map view. Leading Texas Energy, Texas RRC—Public GIS Viewer (Map), pp. 1-4, https://www.rrc.state.tx.us/about-us/resource-center/research/gis-viewers/.

(Continued)

*Primary Examiner* — Scott L Jarrett
(74) *Attorney, Agent, or Firm* — Medler Ferro Woodhouse & Mills PLLC

(57) ABSTRACT

Provided herein are systems and methods for determining a refined oilfield location area from a notified oilfield location. The methods and systems access notifications of intent to obtain a notified oilfield location record that includes at least a notified place name, a notified distance from a place associated with the notified place name and a notified approximate direction from the place associated with the notified place name. The methods and systems further determine a candidate location area based on the notified distance and the notified approximate direction. The methods and system further obtain auxiliary information associated with information identified within the notification of intent. The methods and systems further determine a second candidate location area based on the auxiliary information and determine the refined location area based on an intersection of the first candidate location area and the second candidate location area.

17 Claims, 19 Drawing Sheets

(51) Int. Cl.
*G06K 9/00* (2006.01)
*G06Q 50/26* (2012.01)
*G06Q 50/18* (2012.01)
*G06T 11/60* (2006.01)
*G06F 40/205* (2020.01)

(52) U.S. Cl.
CPC ............. *G06Q 50/18* (2013.01); *G06Q 50/26* (2013.01); *G06T 11/60* (2013.01); *G06F 40/205* (2020.01)

(56) References Cited

U.S. PATENT DOCUMENTS

| | | | | |
|---|---|---|---|---|
| 8,655,671 | B2* | 2/2014 | Morris | G06Q 10/0637 705/1.1 |
| 9,720,555 | B2* | 8/2017 | Sorden | H04W 4/30 |
| 10,361,869 | B2* | 7/2019 | Gorman | H04L 9/3263 |
| 2002/0169757 | A1* | 11/2002 | Bouzek | G06Q 10/10 |
| 2013/0091452 | A1* | 4/2013 | Sorden | E21B 47/04 715/771 |
| 2017/0116434 | A1* | 4/2017 | Finkel | G06Q 50/06 |
| 2017/0293848 | A1* | 10/2017 | Sorden | G01C 21/3664 |

OTHER PUBLICATIONS

Boundaries Ventures Site Data, Leading Texas Energy, Texas RRC—Data Sets, pp. 1-10. https://www.rrc.state.tx.us/about-us/resource-center/research/data-sets-available-for-download/.
Notice Instructions—Rule 9 & 46. Leading Texas Energy, Texas RRC—Notice Instructions—Rule 9 & 46, 1 pg. https://www.rrc.state.tx.us/oil-gas/publications-and-notices/manuals/injectiondisposal-well-manual/notice-instructions-rule-9/.
Notice of Application for [Commercial] Oil & Gas Waste Disposal Well Permit. Leading Texas Energy, Texas RRC, 1 pg. https://www.rrc.state.tx.us/oil-gas/publications-and-notices/manuals/injectiondisposal-well-manual/notice-instructions-rule-9/notice-of-application/.
New Mexico Statewide Spatial Data/Metadata. 1 pg. https://www.nm.blm.gov/shapeFiles/state_wide/spatial_data_metadata.html.
Chapter 8. PostGIS Reference. PostGIS, pp. 1-25. https://postgis.net/docs/reference.html.
Application for Authorization to Inject. State of New Mexico Energy, Minerals and Natural Resources Department, Oil Conservation Division, Form C-108, Revised Jun. 10, 2003. pp. 1-4.
Oil Conservation Division, Underground Injection Control Program Manual. New Mexico Energy, Minerals and Natural Resources Department Oil Conversation Division, dated Feb. 26, 2004. pp. 1-157.
New Mexico Public Land Survey System (PLSS) Finder—NM RGIS dated Apr. 9, 2015. Earth Data Analysis Center, University of Mexico. pp. 1-4. https://rgis.unm.edu/nmplssfinder/.
Chapter 8. PostGIS Reference. PostGIS, pp. 1-11. https://postgis.net/docs/manual-2.0/reference.html.
Underground Injection Control Regulations and Safe Drinking Water Act Provisions. Federal UIC regulations. epa.gov. Dated Oct. 17, 2016. pp. 1-3. https://www.epa.gov/uic/underground-injection-control-regulations-and-safe-drinking-water-act-provisions.
Huffmyer, et., "Treatment of Upstream Oil & Gas Wastewaters Prior to Disposal into a Class IID Well—Marcellus & Utica Shale Play". IWC 16-10. pp. 1-15.
Oil Skimming Operation I Salt Water Disposal Institute's Investors' Guide: Bruce LANGHUS 506-488-1808, Published Jun. 1, 2015, pp. 1-3. www.saltwaterdisposalinstitute.com/oil-skimming-operation/.
Gabriel Collins, J.D., "Oilfield Produced Water Ownership in Texas: Balancing Surface Owners' Rights and Mineral Owners' Commercial Objectives". Baker Botts Fellow in Energy & Environmental Regulatory Affairs dated Feb. 2017. pp. 1-14. https://www.bakerenergyblog.com/2015/06/16/oilfield-water-recycling-could-significantly-boosttexas-water-supplies/.

Final Report—Texas Water Development Board. Manual for Permitting Process. CDM Smith. Dated May 6, 2014, pp. 1-290.
Environmental Geosciences, v. 26, No. 4 (Dec. 2019), pp. 107-124.
Casee R. Lemons, et al., "Spatiotemporal and stratigraphic trends in salt-water disposal practices of the Permian Basin, Texas and New Mexico, United States". Permian Basin Salt-Water Disposal Trends. Environmental Geosciences, v. 26, No. 4 (Dec. 2019), pp. 107-124.
Groundwater Protection Council—2018, "What are the Permitting Processes for a Class II Oil and Gas Disposal Well?". Texas—RRC. 2 pgs. http://tgpc.state.tx.us/frequently-asked-questions-faqs/.
Mike Hightower, et al., Summary of 2018 New Mexico Produced Water Conference "Full Resource Recovery Opportunities and Needs". Produced Water Society, Feb. 2019. 12 pgs.
Produced Water Treatment Fundamentals—Module 2. Produced Water Society Training Course, Fundamentals of Water Treating, Handling and Management. pp. 1-77.
C.E. Clark, et al., Produced Water Volumes and Management Practices in the United States. Argonne National Laboratory. ANL/EVS/R-09/1. Environmental Science Division. Sep. 2009. 64 pgs.
Markus Drouven, Ph. D., et al. Prescriptive Analytics for Produced Water Management. Produced Water Society Seminar 2020. Exenity. Feb. 2020, Houston, TX, 24 pgs.
Aaron Powell, Salty Plaintiffs and Industry Defenses: A Texas Lawyer's Guide to Induced Seismicity and Saltwater Disposal Wells. Texas Tech Law Review. vol. 48.1001. pp. 1001-1041.
Pei Xu, New Mexico State University. Produced Water Treatment and Reuse: Decision Support Tool & Innovative Technologies. Produced Water Society Seminar 2020. 21 pgs.
Texas Review—Technical Review. 4 pgs. https://www.rrc.state.tx.us/oil-gas/publications-and-notices/manuals/injectiondisposal-well-manual/summary-of-standards-and-procedures/technical-re.
John Veil, Veil Environmental, LLC. U.S. Produced Water Volumes and Management Practices in 2012. Prepared for the Ground Water Protection Council. Apr. 2015. pp. pp. 1-119.
Study of Oil and Gas Extraction Wastewater Management Under the Clean Water Act. EPA-821-R19-001. U.S. Environmental Protection Agency. Draft May 2019, 36 pgs.
Andrew Kondash, et al., "Water Footprint of Hydraulic Fracturing". Environmental Science & Technology. ACS Publications. 2015 American Chemical Society. Environ. Sci. Technol. Lett. 2015, 2, 276-280.
Andrew J. Kondash, et al., "Quantity of flowback and produced waters from unconventional oil and gas exploration". Science of the Total Environmental. Elsevier. 2016. 8 pgs. www.elsevier.com/locate/scitotenv.
Bridget R. Scanlon, et al., "Water Issues Related to Transitioning from Conventional to Unconventional Oil Production in the Permian Basin". Environmental Science & Technology. ACS Publications. Environ. Sci. Technol. 2017, 51, 10903-10912.
Hydraulic Fracturing—Schlumberger Oilfield Glossary. 1 pg. https://www.glossary.oilfield.slb.com/Terms/h/hydraulic_fracturing.aspx.
Tiffany Liden, et al., "Unconventional Oil and Gas Production: Waste Management and the Water Cycle". Chapter two. Environmental Issues Concerning Hydraulic Fracturing, vol. 1. 2017 Elsevier Inc. ISSN 2468-9289. pp. 17-45. https://doi.org/10.1016/bs.apmp.2017.08.012.
A Framework for Assessing Water and Proppant Use and Flowback Water Extraction Associated with Development of Continuous Petroleum Resources. USGS Science for a changing world. Fact Sheet 2014-3010, Mar. 2014. 5 pgs.
Bridget R. Scanlon, et al., "Water Issues Related to Transitioning from Conventional to Unconventional Oil Production in the Permian Basin". Supporting Information. pp. S1-S80. Seismological Research Letters—Oct. 31, 2018.
Bridget R. Scanlon, et al., "Managing Basin-Scale Fluid Budgets to Reduce Injection-Induced Seismicity from the Recent U.S. Shale Oil Revolution". SRL Early Edition. Department of Geophysics, 397 Panama Mall, Stanford, California 94305. 12 pgs.
Pages from url: https://www.sourcewater.com/pre-permit-alert/ , as downloaded on May 28, 2020. 5 pgs.

* cited by examiner

Texas public notice text:

APACHE CORPORATION, 303 Veterans Airpark Lane, Suite 3000, Midland, Texas 79705 is applying to the Railroad Commission of Texas for a permit to inject fluids into a formation, which is productive of oil and gas. The applicant proposes to inject fluids into the Clearfork Formation, Ketchum Mountain East Unit Lease, Well Numbers: 2803, 2805, 2807, and 2811. The proposed injection wells are located 12 miles West from Mertzon, Texas in the Ketchum Mt. (Clear Fork) Field, in Irion County, Texas. Fluid will be injected into strata in the subsurface depth interval from 3,575'- 4,405'. LEGAL AUT Notification of Intent 292

Form 290

● Productive ○ Commercial ○ Amendment

Operator: APACHE CORPORATION
Lease: Ketchum Mountain East Unit
Well number: 2803, 2805, 2807, and 2811

Formation: Clearfork
Direction: W
City: Mertzon
Field: Ketchum Mt. (Clear Fork)

Distance: 12 (mi)
Top: 3575
Bottom:

County: Irion

Notes:

[Submit]

Notification Information Fields 228a-n

FIG. 2C

Legal and Public Notices

NOTICE OF Application for [Commercial] Oil & Gas Waste Disposal Well Permit

AQUA TERRA PERMIAN LLC, 11923 SAM HOUSTON PARK DR STE 305, HOUSTON, TX 77064
(Company Name/ Address)

is applying to the Railroad Commission of Texas for a permit to dispose of produced salt water or other oil and gas waste by well injection into a porous formation not productive of oil or gas.

The applicant proposes to dispose of oil and gas waste into the Woodford, Devonian, Silurian,
Fusselman, Montoya, Simpson, Ellenburger                        (Formation Name)
Hat Creek SWD   Lease, Well Number   1  .  The proposed
( Lease Name)

disposal well is located   19.8   miles   SW   of   Midland
                          (Direction)      (Nearest Town)

in the Scrabarry (Trend Area) Field, in County Midland
( Field Name)

The waste water will be injected into strata in the subsurface depth interval from 11,500 to 14,400 feet.

LEGAL AUTHORITY: Chapter 27 of the Texas Water Code, as amended, Title 3 of the Texas Natural Resources Code, as amended, and the Statewide Rules of the Oil and Gas Division of the Railroad Commission of Texas.

Requests for a public hearing from persons who can show they are adversely affected or requests for further information concerning any aspect of the application should be submitted in writing, within fifteen days of publication, to the Environmental Services Section, Oil and Gas Division, Railroad Commission of Texas, P.O. Box 12967, Austin, Texas 78711 (Telephone 512/463-6792).

FIG. 3A

NOTICE OF APPLICATION FOR FLUID INJECTION WELL PERMIT

Blackbeard Operating, LLC, 1751 River Run, Suite 405, Fort Worth, TX 76107 is applying to the Railroad Commission of Texas for a permit to inject fluid into a formation which is productive of oil and gas. The applicant proposes to inject fluid in the Wichita Albany & Wolfcamp Formations, CBone Lease, Well No. 202SD. The proposed injection well is located ±11.7 miles Northwest of Monahans, Texas in the Keystone, South Field, in Winkler County, Texas. Fluid will be injected into strata in the subsurface depth interval from 6,615 feet to 8,105 feet.

LEGAL AUTHORITY: Chapter 27 of the Texas Water Code, as amended, Title 3 of the Texas Natural Resources Code, as amended, and the Statewide Rules of the Oil and Gas Division of the Railroad Commission of Texas.

Requests for a public hearing from persons who can show they are adversely affected, or requests for further information concerning any aspect of the application should be submitted in writing, within fifteen days of publication, to the Environmental Services Section, Oil and Gas Division, Railroad Commission of Texas, P.O. Box 12967, Capitol Station, Austin, Texas 78711 (Telephone 512/463-6792).

FIG. 3B

Notice of Amendment to an Application for Commercial Fluid Injection Well Permit
DACO Operating, LLC, PO Box 64442 Lubbock, Texas 79464 is applying to the Railroad Commission of Texas to amend a permit to inject fluid into a formation which is productive of oil and gas.
The applicant proposes to dispose of oil and gas waste into the Bell and Cherry Canyon formations, Stateline SWD, Well No. 3. The proposed disposal well is located 16.5 miles North of Orla in the Battleaxe (Delaware) field, in Loving County.

The waste water will be injected into strata in the subsurface depth interval from 4,190 to 6,550 feet.
Legal Authority: Chapter 27 of the Texas Water Code, as amended, Title 3 of Texas Natural Resources Code, as amended, and the Statewide Rule of the Oil and Gas Division of the Railroad Commission of Texas.

FIG. 3C

NOTICE OF APPLICATION FOR OIL AND GAS WASTE DISPOSAL WELL PERMIT

Crimson Exploration Oper. Inc., 717 Texas Avenue, Suite 2900, Houston, TX 77002, is applying to the Railroad Commission of Texas for a permit to inject fluid into a reservoir productive of oil or gas.

The applicant proposes to inject fluid into the Old Salt SWD 15 #1, located 16.99 miles NW of Fort Stockton in the Hamon, Northwest (Delaware) field in Pecos County. The fluid will be injected into the Delaware formation in the subsurface depth intervals from 5300 - 7700 feet.

Legal Authority: Chapter 27 of the Texas Water Code, as amended, Title 3 of the Texas Natural Resources Code, as amended and the Statewide Rules of the Oil and Gas Division of the Railroad Commission of Texas.

Requests for a public hearing from persons who can show they are adversely affected, or requests for further information concerning any aspect of the application should be submitted in writing, within 15 days of publication, to the Environmental Services Section, Oil and Gas Division, Railroad Commission of Texas, PO Box 12967, Capital Station, Austin, Texas, 78711 (Telephone 512-463-6792).

FIG. 3D

DETERMINATION OF REFINED OILFIELD WATER DISPOSAL LOCATIONS BASED ON LEGAL NOTIFICATIONS

RELATED APPLICATIONS

This application claims the benefit of prior U.S. Provisional Patent Application Ser. No. 62/883,517, filed Aug. 6, 2019, which is hereby incorporated by reference in its entirety for all purposes.

TECHNICAL FIELD

The present invention generally relates to systems and methods for determining a refined oilfield location area relating to a proposed oilfield activity based on a notification of an approximate location of the oilfield activity and the use of auxiliary information sources.

BACKGROUND

Hydraulic fracturing is the process of injecting a hydraulic liquid such as water or gel into shale rock under pressure in order to create or expand cracks to facilitate the extraction of subterranean natural gas and oil. Use of this technique has grown rapidly in recent years.

Water is not only needed to initiate the hydraulic fracturing process (the injectate), but may also often be recovered, produced or released as part of the operation. This wastewater may be a return of the injected water (known as 'flowback' water) or may be other underground or connate water that is released or co-produced as part of the oil and gas extraction process (known as 'produced' water). In either case, the wastewater typically has a high salt content, hence is commonly termed 'saltwater'. The quantity of returned saltwater can often be large, for example, exceeding by far the quantity of oil obtained from the well. The nature of the hydraulic fracturing and oil and gas productions processes therefore bring about a requirement not only to source large amounts of water at the outset of a project, but also to dispose-of or treat and recycle water during the project or within a well's lifetime.

In support of this need for efficient water management in the energy industry, tools to facilitate a dynamic online platform for water sourcing, recycling and disposal may be employed in which buyers and sellers of water source or disposal capacity may advertise or exchange information related to either an availability-of or a requirement-for water, including a number of relevant attributes such as its quantity, location, type, and quality. Such a platform may address not only the water resource needs associated with oilfield exploration and development, but also the need and supply of other associated oilfield resources, services, or infrastructure. It may further be used by any party with an interest in tracking oilfield development.

Within the oil and gas industry, wastewater from oilfield operations is often transported by truck or by pipeline from a 'producing well' (where oil, gas and the wastewater byproduct are produced), to a 'saltwater disposal' well (or SWD) where the wastewater is permanently disposed of. Some saltwater disposals may accept water via pipeline only, via truck only, or via a mix of both pipeline and truck. Saltwater is potentially hazardous to the environment and must also not contaminate fresh or drinking water supplies, hence care is needed for its safe disposal. Disposal of the wastewater may be made via a drilled hole providing a connection into underground porous rock formations in order to avoid the risks of such contamination of freshwater at shallower subsurface depths. A disposal well will typically target disposal into one or more particular formations, and within a certain depth range, known as an "injection interval".

Due to the environmental risks involved, the injection or disposal of liquids underground is usually subject to control and regulation. In some jurisdictions, injection wells are categorized into different classes and types in order that regulations particular to each may be defined and imposed. For example, as part of its Underground Injection Control (UIC) program the United States Environmental Protection Agency (USEPA) has designated six different classes of injection wells. Of these, Class II relates to the "injection of brines and other fluids associated with oil and gas production, and hydrocarbons for storage" and wells of this class are of particular relevance to the present disclosure. In some jurisdictions, each class may also be subdivided into a number of "types". For example, in the case of Class II injection wells, the Texas Railroad Commission (RRC) identifies eight sub-types. Of these, at least types 1, 2 and 3 are associated with the disposal or injection of saltwater. In further detail, both Type 1 and Type 2 are used for waste disposal purposes (into formations that are nonproductive and productive of oil and gas respectively), hence are commonly referred to as "disposal wells". Class II Type 3 concerns wells into which saltwater (or other fluids) are injected for the purposes of enhancing the recovery or production of oil and gas. In such cases, fluid is injected to displace oil and gas, or to replenish oil or gas volumes that have been previously extracted in order to maintain a suitable pressure in the associated formation such that oil and gas production can continue. Type 3 wells are often known as "Secondary Recovery" (SR) or "Tertiary Recovery" wells.

Additional processing may also be performed on the wastewater either for treatment (such as skim-oil recovery) prior to disposal, or for recycling (e.g. for use as an injectate at the same site or at another drilling site or injection well).

There are at least three types of commercial entities involved in the disposal of wastewater in oilfield regions: i) oilfield operators producing the water as a byproduct of their operations, ii) "midstream" companies who transport the water by pipeline or truck to disposal stations and iii) disposal companies who ultimately receive and dispose of the wastewater. In some cases, commercial entities may exist in which these functions are 'vertically integrated' into a single controlling entity. For example, an oilfield operator may run its own disposal facility, or a disposal company may run its own water transportation service. In other cases, these three different types of entities may exist and operate independently. In yet further cases, the entities may be independent but have close commercial ties or contracts in place that reduce the set of customers or suppliers that they commonly do business with.

Well owners (such as oil and gas well operators or disposal companies) require a permit to dispose of saltwater. If a well owner wishes to propose a new disposal well, to modify an existing disposal well, or to convert an existing well into a disposal well, the State of Texas (amongst other jurisdictions) requires well owners (e.g. operators or disposal companies) to publish a corresponding "notification of intent" in newspapers. The notification of intent serves to notify other interested parties and the wider public that they intend to submit the corresponding formal permit applications to the regulatory agency, for example to the Texas Railroad Commission (RRC). In addition to their publication in newspapers, such notifications may also be aggregated in order to facilitate online searching. For the case of Texas, one example of such an aggregation service is available at www.texaslegalnotices.com and is provided by the Texas Press Association. The information provided in such notifications, however, may be imprecise, ambiguous, or otherwise unreliable for the determination of oilfield locations.

In order to alleviate such problems, systems and methods are needed to provide more precise locations at which oilfield activity is proposed than those available solely from the notifications of intent. The disclosure herein provides a technical solution to these problems and describes systems and methods for determining a refined oilfield location area from a notified oilfield location.

SUMMARY

The present disclosure describes computer-implemented systems and methods that are capable of identifying an approximate oilfield location and other information fields from within a notification of intent, for selectively obtaining additional auxiliary information that may be associated with the identified information, and for determining a refined oilfield location area using both the information within the notification of intent and the additional auxiliary information. In some embodiments, the refined oilfield location area is determined by a server of an online platform and is subsequently provided to users or administrators of the online platform in order to provide such users and administrators with an improved understanding of potential upcoming oilfield activity and its location.

In an example embodiment, a computer-implemented method is described for determining a refined oilfield location area from a notified oilfield location, the method comprising: obtaining, from a notification of intent, a notified oilfield location record comprising a notified place name, a notified distance from a place associated with the notified place name and a notified approximate direction from the place associated with the notified place name; determining an angular range based on the notified approximate direction; determining a distance range based on the notified distance; determining a first candidate location area based on both the angular range and on the distance range; obtaining auxiliary information associated with information identified within the notification of intent; determining a second candidate location area based on the auxiliary information; determining a refined oilfield location area based on an intersection of the first candidate location area and the second candidate location area.

In another embodiment, a system for determining a refined oilfield location area from a notified oilfield location is provided. The system includes a non-transitory computer readable memory unit and at least one processor configured to execute computer instructions. The processor is configured to execute the computer instructions to: obtain, from a notification of intent, a notified oilfield location record comprising a notified place name, a notified distance from a place associated with the notified place name and a notified approximate direction from the place associated with the notified place name; determine an angular range based on the notified approximate direction; determine a distance range based on the notified distance; determine a first candidate location area based on both the angular range and on the distance range; obtain auxiliary information associated with information identified within the notification of intent; determine a second candidate location area based on the auxiliary information; and determine the refined oilfield location area of proposed oilfield activity based on an intersection of the first candidate location area and the second candidate location area In another embodiment, a non-transitory computer readable medium storing computer instructions that, when executed by a processor, cause the processor to carry out a method for determining a refined oilfield location area from a notified oilfield location is provided. The method includes obtaining, from a notification of intent, a notified oilfield location record comprising a notified place name, a notified distance from a place associated with the notified place name and a notified approximate direction from the place associated with the notified place name; determining an angular range based on the notified approximate direction; determining a distance range based on the notified distance; determining a first candidate location area based on both the angular range and on the distance range; obtaining auxiliary information associated with information identified within the notification of intent; determining a second candidate location area based on the auxiliary information; and determining the refined location area based on an intersection of the first candidate location area and the second candidate location area.

Other aspects and advantages of the invention will become apparent from the following detailed description, taken in conjunction with the accompanying drawings, which illustrate by way of example the principles of the invention.

BRIEF DESCRIPTION OF THE DRAWINGS

FIG. 2C shows an example of a Graphical User Interface form comprising notification information fields and which may be presented to a user or administrator of an oilfield location refinement system, according to some embodiments.

FIG. 3A, FIG. 3B, FIG. 3C and FIG. 3D show published examples of notifications of intent to dispose of oilfield wastewater.

DETAILED DESCRIPTION

Figure 1A:
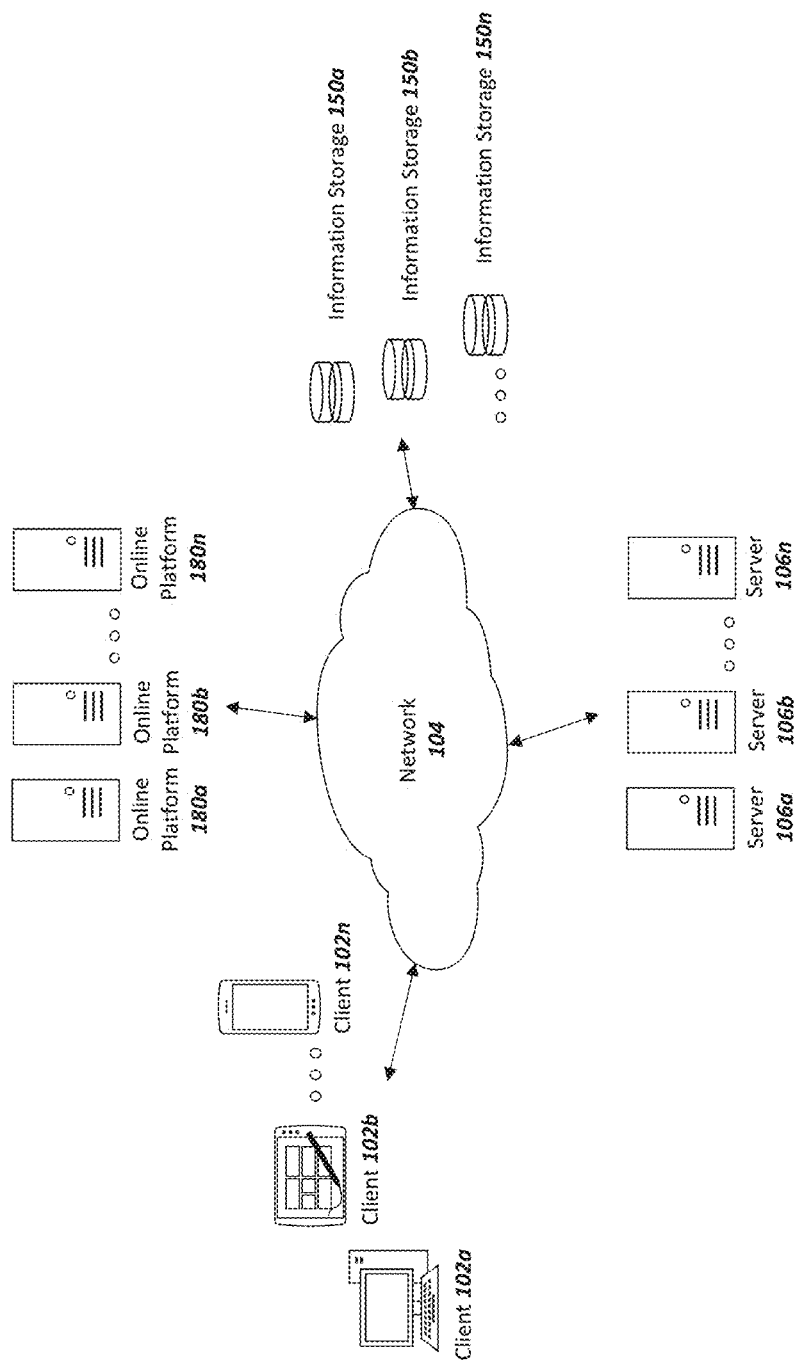
FIG. 1A is a block diagram depicting an embodiment of a network environment comprising client devices in communication with online platform devices, information storage devices, and server devices, according to some embodiments.

Notifications of intent are required in various jurisdictions as part of the formal permit application process to give landowners, other operators, and any other interested party the opportunity to comment, object or protest if they choose.

In some jurisdictions, requirements or guidelines may be imposed as to the information that must or should be provided within a notification of intent. For example, at its website https://www.rrc.state.tx.us, the Railroad Commission of Texas provides a template entitled "Notice of Application for [Commercial] Oil & Gas Waste Disposal Well Permit" that lists the information fields of Table 1 to be included by the applicant within the published notice of intent.

TABLE 1

Information Fields in the Texas RRC Notification of Intent Template

| Information | Additional Description |
|---|---|
| Company Name/ Address | The name and address of the company making the proposal |
| Formation Name | The name of the formation to which the well connects |
| Lease Name | The name of any associated Oil, Gas or Mineral lease |
| Well Number | Any existing identifier or number of the well |
| Nearest Town | A place name of the nearest town or city |
| Distance from nearest town | Distance of the disposal well from the named nearest town |
| Direction from nearest town | Direction of the disposal well from the named nearest town |
| Field Name | The name of the "field" in which the existing or proposed well is or is to be located. Wells within different areas of exploratory oilfields are associated with different field names. |
| County Name | The name of the county in which the well is (or will be) located |
| Depth interval | The maximum and minimum depths between which the fluid will be injected |

However, while the information content within a notification of intent may provide some indication or record of an approximate location of a proposed oilfield activity (such as saltwater disposal), there may often be no requirement to provide a precise location of the proposed activity, for example via a longitude and latitude pair, or via other suitable geographical coordinates. Such an absence of precise location information is problematic to those who may be potentially affected by the proposed activity yet are unaware of its proximity to their land, property or other business interests. More generally, the absence of precise location information for proposed activities is also problematic for any individual, group or commercial entity desiring accurate and up-to-date insight into the status of oilfields and proposals for their development.

In particular, in the case of the Texas RRC notification template fields as illustrated in Table 1, applicants almost always provide only an approximate direction from the nearest town, such as "South West" or "North" which can lead to large geographical areas in which the disposal well may be located. Furthermore, any provided well number may not serve as an identifier from which the location of the well can be ascertained. For example, the well numbering scheme may be largely arbitrary or proprietary to the applicant's company or may not conform to a numbering scheme that is standardized or which can be accessed or referenced by others. The absence of precise location information in notices of intent are therefore the source of significant ambiguity.

The term "oilfield location" as used within this disclosure relates to a location of relevance to oil or gas production. Within the oil and gas industry, certain areas of oil and gas exploration or production are assigned "field names". While such named "fields" qualify in general as "oilfield locations," these specifically named areas are referred to as "oilfield field areas" throughout the description. Of itself, the term "oilfield" does not imply any connection with a named oilfield field area.

Embodiments provided herein offer a technical solution to the deficiencies inherent in published notifications of intent. More specifically, as described below, technical means are provided to extract relevant information from notifications of intent, analyze this information according to novel rules-based methods, and provide refined oilfield location data with increased precision.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for detecting and determining information regarding a substance transfer station.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, mobile device(s) 102, remote device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, platform node(s) 180, platform machine(s) 180, or remote online platform machine(s) 180), and one or more information storages 150a-150n (also generally referred to as information storage(s) 150, record node(s) 150, record machine(s) 150, or remote record machine(s) 150) via one or more networks 104. In some embodiments, one or more of client 102, online platform 180, or information storage 150 has the capacity to function as both a node seeking access to resources provided by a server and as a server providing access to hosted resources for other clients 102a-102n, online platforms 180a-180n, and information storages 150a-150n. Examples of client(s) 102 includes user(s) 190 and subscriber(s) 195.

Although FIG. 1A shows a network 104 between clients 102, online platforms 180, information storage 150, and the servers 106, in examples clients 102, online platforms 180, information storage 150 and servers 106 may be on the same network 104. In some embodiments, there are multiple networks 104 between clients 102, online platforms 180, information storage 150 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks. Servers 106 may be used to generically refer to all of online platforms 180, information storage 150 and servers 106. Clients 102, online platforms 180, and information storage 150 may process input from server 106 and/or may provide access as needed to various applications, modules, and other software components of server 106 to other various applications, modules, and other software components of server 106.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 104 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 104 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180 and information storage 150 may be a file server, application server, web server, proxy server, appliance, network appliance, gateway, gateway server, virtualization server, deployment server, SSL VPN server, or firewall. In one embodiment, a plurality of servers 106, online platforms 180 and information storages 150 may be in the path between any two communicating servers 106, online platforms 180 and information storages 150.

Figure 1B:
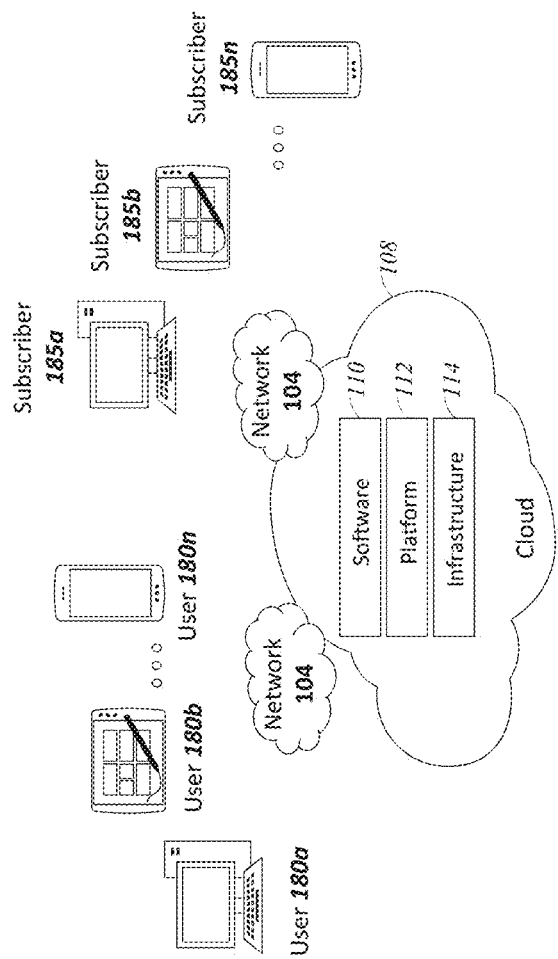
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide user 190 and subscriber 195 with one or more resources provided by a network environment. The cloud computing environment may include one or more users 190a-190n and one or more subscribers 195a-195n in communication with the cloud 108 over one or more networks 104. Users 190 and subscribers 195 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for user 190 or subscriber 195. The cloud 108 may include back end platforms, e.g., servers 106, storage, server farms or data centers.

The cloud 108 may be public, private, or hybrid. Public clouds may include public servers 106 that are maintained by third parties to client(s) 102, for example user(s) 190 and subscriber(s) 195 or owners of client(s) 102, user(s) 190, and/or subscriber(s) 195. The servers 106 may be located off-site in remote geographical locations as disclosed above or otherwise. Public clouds may be connected to the servers 106 over a public network. Private clouds may include private servers 106 that are physically maintained by client(s) 102, for example user(s) 190 and/or subscriber(s) 195 or owners of client(s) 102, user(s) 190, and/or subscriber(s) 195. Private clouds may be connected to the servers 106 over a private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g., Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Client(s) 102, for example user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example user(s) 190 and/or subscriber(s) 195 may access SaaS resources through the use of web-based user interfaces, provided by a web browser (e.g., Google Chrome, Microsoft Internet Explorer, Microsoft Edge, or Mozilla Firefox provided by Mozilla Foundation of Mountain View, Calif.). Client(s) 102, for example user(s) 190 and/or subscriber(s) 195 may also access SaaS resources through smartphone or tablet applications, including e.g., Salesforce Sales Cloud, or Google Drive App. Client(s) 102, for example user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
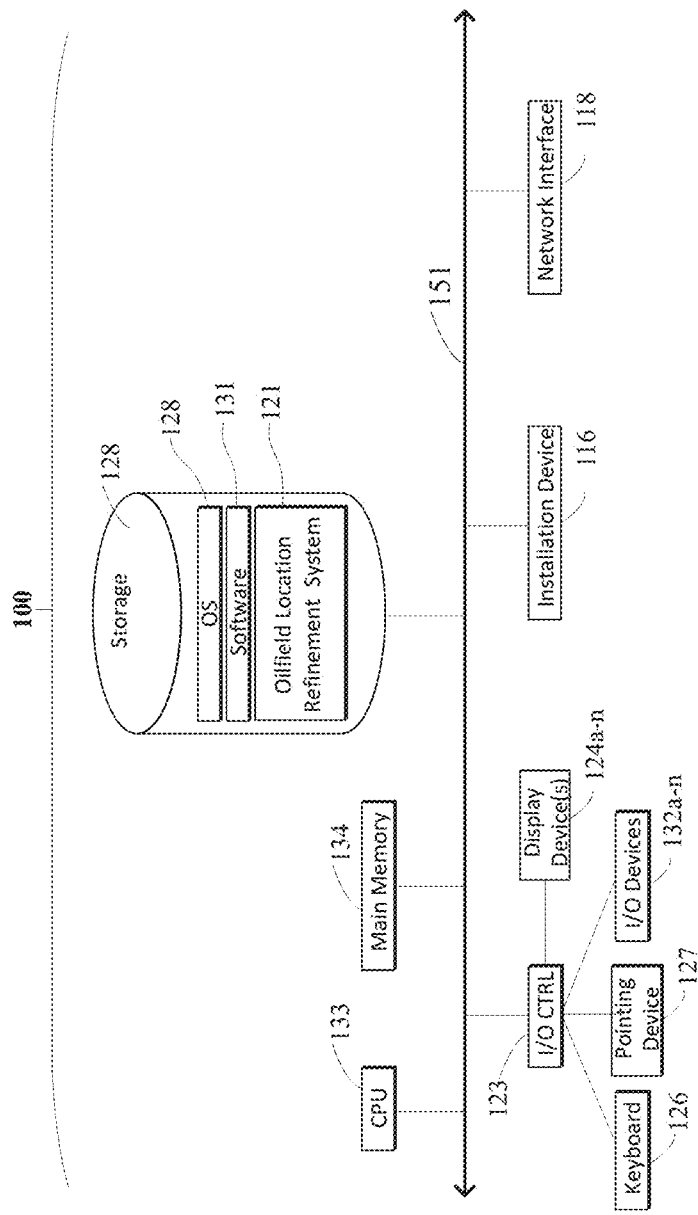
FIG. 1C and FIG. 1D are block diagrams depicting embodiments of computing devices useful in connection with the methods and systems described herein.
Figure 1D:
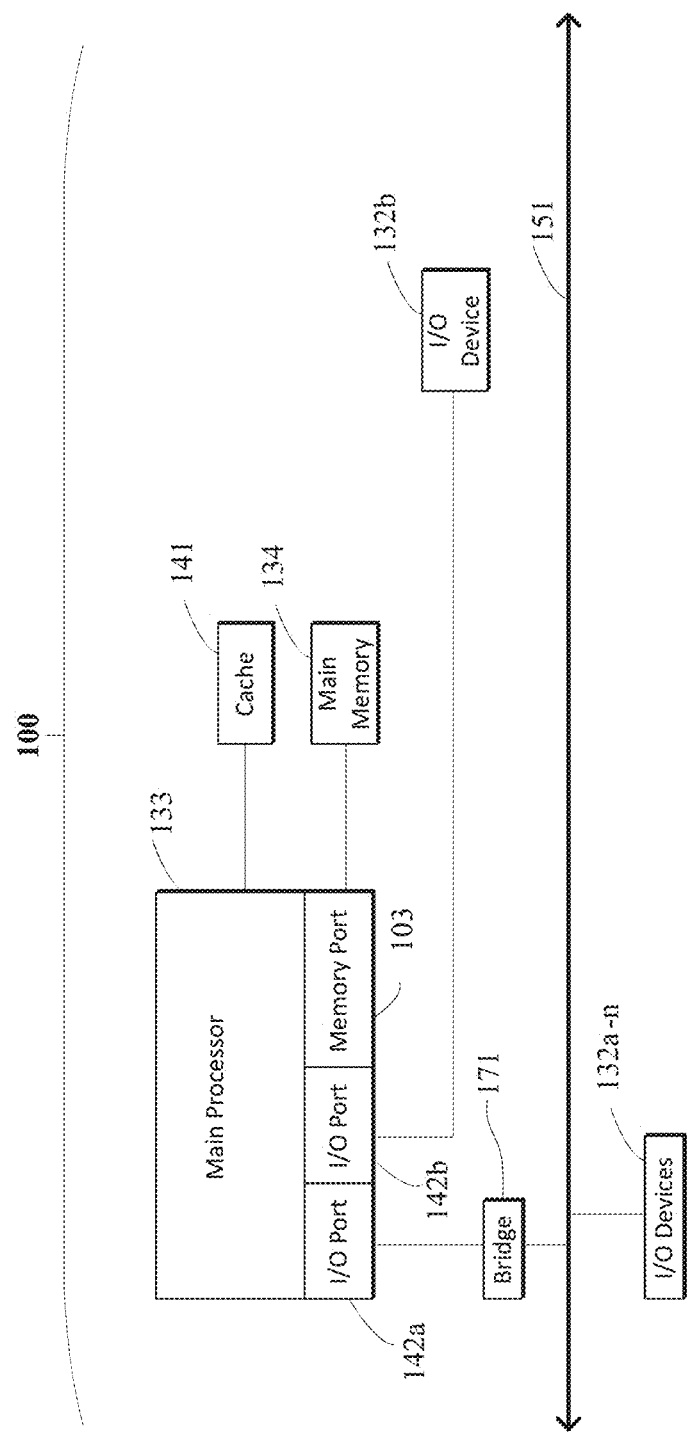

Client(s) 102, for example user(s) 190 and/or subscriber(s) 195 and server 106 may be deployed as and/or executed on any type and form of computing device, e.g., a computer, network device or appliance capable of commu- FIGS. 1C and 1D depict block diagrams of a computing device 100 useful for practicing an embodiment of the client 102, online platform 180, information storage 150 and the server 106. As shown in FIGS. 1C and 1D, each computing device 100 includes a central processing unit 133, and a main memory unit 134. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system 129, software 131, and a software of an oilfield location refinement system 121. As shown in FIG. 1D, each computing device 100 may also include additional optional elements, e.g., a memory port 103, a bridge 171, one or more input/output devices 132a-132n (generally referred to using reference numeral 132), and a cache memory 141 in communication with the central processing unit 133.

The central processing unit 133 is any logic circuitry that responds to and processes instructions fetched from the main memory unit 134. In many embodiments, the central processing unit 133 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER4 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 133 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i4.

Main memory unit 134 may include on or more memory chips capable of storing data and allowing any storage location to be directly accessed by the microprocessor 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 134 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 134 may be based on any of the above described memory chips, or any other available memory chips capable of operating as described herein. In the embodiment shown in FIG. 1C, the processor 133 communicates with main memory 134 via a system bus 151 (described in more detail below). FIG. 1D depicts an embodiment of a computing device 100 in which the processor communicates directly with main memory 134 via a memory port 103. For example, in FIG. 1D the main memory 134 may be DRDRAM.

FIG. 1D depicts an embodiment in which the main processor 133 communicates directly with cache memory 141 via a secondary bus, sometimes referred to as a backside bus. In other embodiments, the main processor 133 communicates with cache memory 141 using the system bus 151. Cache memory 141 typically has a faster response time than main memory 134 and is typically provided by SRAM, BSRAM, or EDRAM. In the embodiment shown in FIG. 1D, the processor 133 communicates with various I/O devices 132 via a local system bus 151. Various buses may be used to connect the central processing unit 133 to any of the I/O devices 132 including a PCI bus, a PCI-X bus, or a PCI-Express bus, or a NuBus. For embodiments in which the I/O device is a video display 124, the processor 133 may use an Advanced Graphic Port (AGP) to communicate with the display 124 or the I/O controller 123 for the display 124. FIG. 1D depicts an embodiment of a computer 100 in which the main processor 133 communicates directly with I/O device 132b or other processors 133' via HYPERTRANSPORT, RAPIDIO, or INFINIBAND communications technology. FIG. 1D also depicts an embodiment in which local busses and direct communication are mixed: the processor 133 communicates with I/O device 132a using a local interconnect bus while communicating with I/O device 132b directly.

A wide variety of I/O devices 132a-132n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132a-132n may include a combination of multiple input or output (I/O) devices, including, e.g., Microsoft KINECT, Nintendo Wiimote for the WIT, Nintendo WII U GAMEPAD, or Apple iPhone. Some I/O devices 132a-132n allow gesture recognition inputs through combining some of the inputs and outputs. Some I/O devices 132a-132n provide for facial recognition which may be utilized as an input for different purposes including authentication and other commands. Some I/O devices 132a-132n provide for voice recognition and inputs, including, e.g., Microsoft KINECT, SIRI for iPhone by Apple, Google Now or Google Voice Search, and Alexa by Amazon.

Additional I/O devices 132a-132n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 132a-132n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, an I/O device 132 may be a bridge between the system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 132a-132n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the oilfield location refinement system software 121. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 151. Some storage device 128 may be external and connect to the computing device 100 via an I/O device 132 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11 a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 340 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, the computing device 100 is a tablet e.g., the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g., the KINDLE family of devices by Amazon.com, or NOOK family of devices by Barnes & Noble, Inc. of New York City, N.Y.

In some embodiments, client 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, the client(s) 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Main Description

The following describes systems and methods that are useful for determining a refined oilfield location area from a notified oilfield location. Applications of the present invention may include determining a refined oilfield location area based on an approximate location provided within a published notification of intent. In embodiments, the systems and methods may identify other information fields within the published notification of intent and may obtain additional auxiliary information that may be associated with the other information fields in order to refine the approximate location and define, with improved accuracy, a geographical location area in which an oilfield activity is proposed to take place. In some embodiments, the systems and methods may further enable users and administrators of an online platform to configure and control the system and to obtain the refined oilfield locations that are determined as a result of its operation. In some embodiments, the online platform may be dedicated to, or primarily focused on, the determination of refined oilfield locations from approximate locations provided within notifications of intent. In other embodiments, the systems and methods described may extend, complement or otherwise improve the capabilities of an existing online platform for oilfield water management and/or oilfield navigation.

Details of the disclosed systems and methods are provided by means of the accompanying figures and description as follows.

Figure 2A:
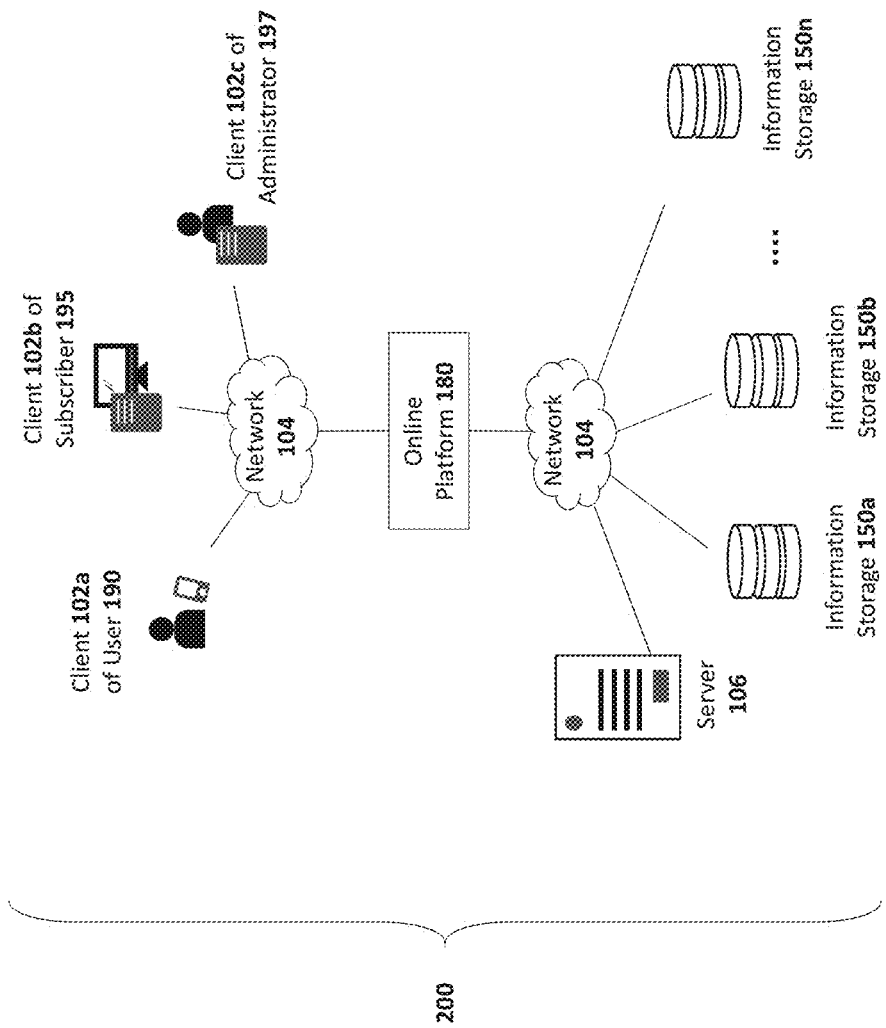
FIG. 2A shows an oilfield location refinement system suitable for determining a refined oilfield location area from a notified oilfield location, and for providing the refined oilfield location area to users of an online platform, according to some embodiments.

In a general overview, FIG. 2A shows an oilfield location refinement system 200 suitable for determining a refined oilfield location area from a notified oilfield location, and for providing the refined oilfield location area to users of an online platform 180, according to some embodiments.

Referring to FIG. 2A in more detail, system 200 may comprise one or more servers 106, one or more information storages 150a-n, one or more online platforms 180 and one or more clients 102a, 102b, 102c operated by users 190, subscribers 195 or administrators 197.

Any of server 106, information storages 150, online platform 180 and clients 102 may be connected to one another. Depending on the application or environment, the connection may be achieved via wired or wireless means, and such a connection may be either direct or may traverse a network 104. For ease of illustration, example connections of FIG. 2A are shown traversing a network 104 though such a network need not be present and may be replaced with a direct connection or no connection at all.

In examples, online platform 180 may be focused on, or dedicated to, the task of determining refined oilfield location areas based on legal notifications of intent to conduct an oilfield activity, such as to dispose of oilfield saltwater or other waste products, and of providing the refined location information to its users 190, subscribers 195 or administrators 197. In other examples, online platform 180 may comprise an oilfield water platform in which users 190 and subscribers 195 may advertise or exchange information related to an availability-of or need-for oilfield water or other associated oilfield resources, services, or infrastructure. Alternatively, or in combination, online platform 180 may comprise an oilfield navigation platform to assist oilfield workers (such as users 190 and subscribers 195 of the online platform) to route-to and locate oilfield sites, facilities and properties. Such purposes and uses of online platform 180 serve as illustrative examples only and do not limit application of the described systems and methods to other types of online platform 180.

Server 106 or online platform 180 may communicate with information storages 150a-n either directly, or via a network 104. In some examples, any of information storages 150a-n may be comprised within, or lie external to server 106. Information may be written to or retrieved from any of information storages 150a-n. Information storages 150a-n may possess certain other attributes or characteristics. For example, any of information sources 150a-n may be privately or publicly owned or may be local or remote to server 106. Further example characteristics of information sources 150a-n may be that the information they comprise is freely or publicly accessible or has restricted access for example only to users of a specific entity, or group. Yet further characteristics of information sources 150a-n may be that the information they comprise is available with or without a financial cost or subscription. It shall be appreciated that such characteristics are exemplars only hence do not limit the scope of the description and other equivalent or similar information sources may be equally suitable for use within system 200.

In examples, information storage 150a may be a notification storage 210 comprising one or more notification records 222. Notification records 222 may also be referred to herein as notified oilfield location records. Each notification record 222 may comprise an electronic copy or representation of a published notification of intent to conduct a proposed oilfield activity. In examples, such notifications of intent may have necessarily been published online, or via a physical printed medium such as a newspaper, in order to comply with legal requirements within a given jurisdiction. The electronic copies or representations may be stored in any suitable format, including but not limited to, plain or rich text, Portable Document Format (PDF), lossy or lossless image formats (such as Joint Photographic Experts Group—JPEG—files, bitmap files or vector-based image files), file formats suitable for word processing applications, spreadsheet applications or database applications and so forth.

In examples, information storage 150b may be a first auxiliary information storage 270a comprising auxiliary information 234 useful for refining a geographical location area in which an oilfield activity has been proposed (e.g. as may have been notified via a published notification of intent). In examples, auxiliary information may comprise information on: the geographical locations of towns, cities, roads or transportation infrastructure; the geographical locations of country, state or county borders, the geographical locations of oilfield sites, equipment, installations or other features, information on geological, hydrological or subterranean structures, information on the ownership of oilfield sites, infrastructure or land, historical records of oilfield activity and so forth.

In examples, another information storage, 150c, may be a second auxiliary information storage 270b comprising further auxiliary information 234. Such further auxiliary information 234 may again be any information useful for refining a geographical location area in which an oilfield activity has been proposed, such as has been described above for information storage 150b. More generally, auxiliary information 234 may be stored across any number of information storages 150a-n that are configured to store auxiliary information (also denoted auxiliary information storages 270 with reference to FIG. 2B).

Any of information storages 150a-n may be configured to store configuration information such as that received from a user 190, subscriber 195, or administrator 197 of online platform 180. Such configuration information may enable such users 190, subscribers 195 or administrators 197 to control the functionality and behaviors of system 200. For example, configuration information held within an information storage 150d may allow a user 190 to specify a particular notification of intent for the system to analyze, or to specify a date range or location area within which to search for published notifications of intent that may be of interest. In further examples, users 190, subscribers 195 or administrators 197 may specify or configure further criteria to control, guide or constrain which notifications of intent are to be analyzed by system 200. For examples, such criteria may include the names of oilfield operating companies or disposal companies associated with published notifications of intent, the names of formations that may be implicated or affected, the names of leases under which the proposals are being made, field names, county names, injection intervals or injection depths, newspaper or publication names, and so forth.

Embodiments of system 200 may include functionality to determine refined oilfield location areas relating to proposed oilfield activities as notified within notifications of intent, and to provide or present the refined oilfield location areas to clients 102 of users 190, subscribers 195 or administrators 197 of the system.

In examples of system 200, the configuration and maintenance of server 106, online platform 180, information storages 150a-n or clients 102a-c may be controlled by administrator 197 who may access or control these either directly or via a network 104. Operations that may be performed by administrator 197 may include for example, the updating of software or firmware used by any component of the server 106, the clients 102, the online platform 180, the information storages 150 or the networks 104. Further administrative operations may include the configuring, receiving or processing of diagnostic reports or logs, the configuring of parameters, variables, or thresholds used by any component of the system, the reading or writing of data from storages and the configuring of networks.

Figure 2B:
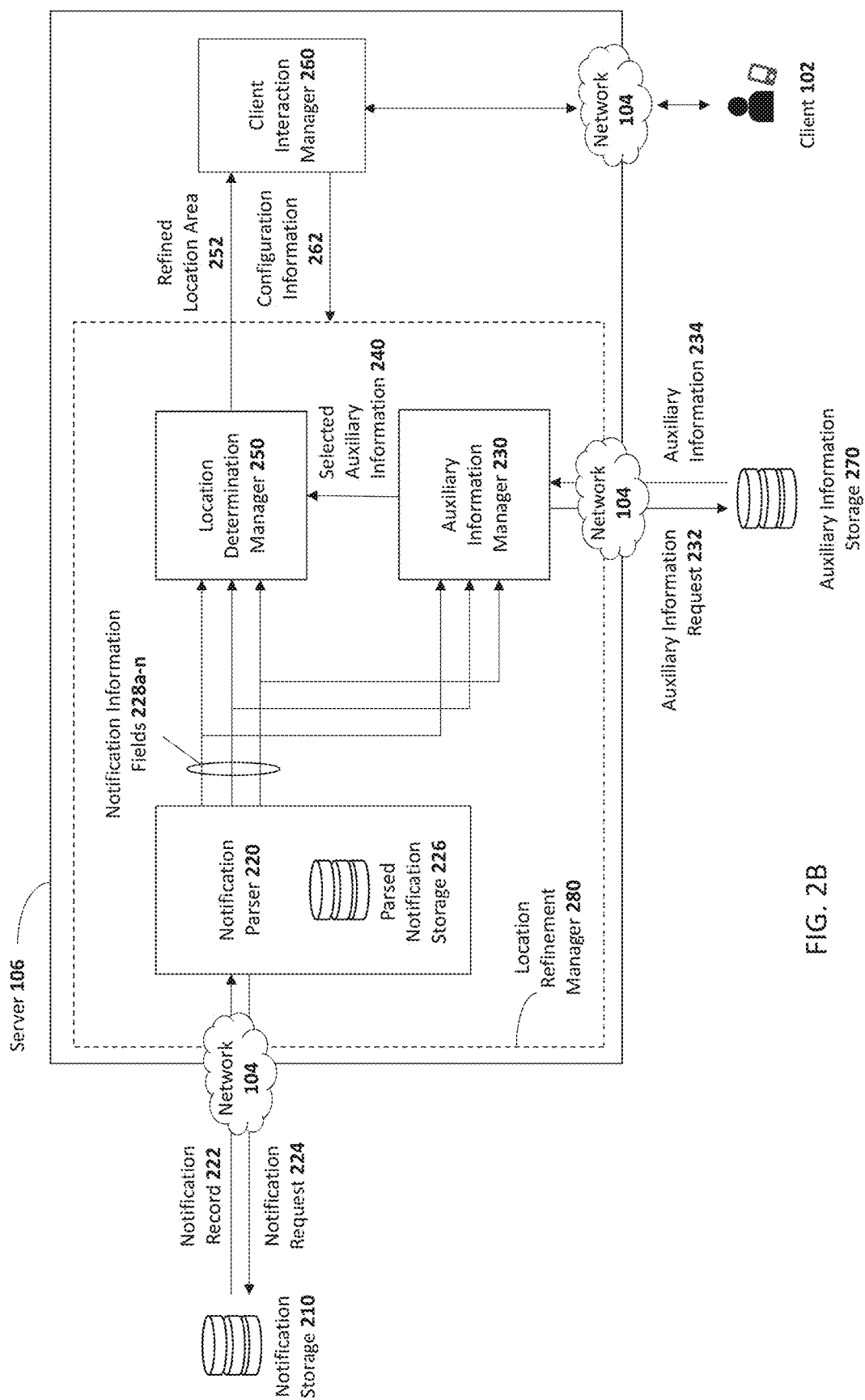
FIG. 2B shows a server in connection with other components of an oilfield location refinement system, according to some embodiments.

FIG. 2B shows a server 106 in connection with other components of an oilfield location refinement system, according to some embodiments.

Referring to FIG. 2B in further detail, server 106 may be connected to a variety of other components of system 200, optionally via one or more networks 104. In the example of FIG. 2B, server 106 is connected to one or more notification storages 210, to one or more auxiliary information storages 270 and to one or more clients 102.

Notification storage 210 may represent one example of an information storage 150a-n, and as previously described in the context of FIG. 2A, may comprise one or more notification records 222 stored in a suitable electronic format, such as a text format, an image format, a document format, a spreadsheet format, a database format and so on. Each notification record 222 may comprise a representation of, or other information regarding a published notification of intent to conduct an oilfield activity, such as to dispose of saltwater arising from oil or gas production. While FIG. 2B shows notification storage 210 as a component external to server 106, it shall be appreciated that this serves as one illustrative example only, and alternative embodiments in which notification storage 210 is comprised within server 106 are also possible.

Auxiliary information storage 270 may also represent an example of an information storage 150a-n, and as previously described in the context of FIG. 2A, may comprise any information useful for refining a geographical location area in which an oilfield activity has been proposed, such as for example, geographical map data, information on oilfield topology and oilfield features, geological information and so forth. While FIG. 2B shows auxiliary information storage 270 as a component external to server 106, it shall be appreciated that this serves as one illustrative example only, and alternative embodiments in which auxiliary information storage 270 is comprised within server 106 are also possible.

Client 102, such as a client of a user 190, subscriber 195 or administrator 197 of an online platform 180, may communicate bidirectionally with sever 106, optionally via one or more networks 104. Such networks may comprise any suitable fixed-line or wireless networks, or combinations thereof. In some examples, and as shown in FIG. 2B, communications between server 106 and client 102 may be processed, managed or controlled by a client interaction manager 260 of server 106. In cases where an administrator 197 is located in close proximity to server 106, a network connection may not be required and instead a direct connection between the administrator's client 102 and server 106 may be used. Extending such an example yet further, in some cases an administrator 197 may interact directly with server 106 via suitable input/output devices such as a keyboard, mouse and display without the need for a client 102 at all, or by using only basic functionality of a client 102 to effect the input/output operations.

In embodiments, server 106 may comprise a location refinement manager 280. In examples, location refinement manager 280 may be configured to retrieve notification records 222 from notification storage 210, to parse the retrieved notification records in order to determine and store notification information fields 228a-n that are contained within them, to retrieve, based on the determined notification information fields 228a-n, auxiliary information 234 from auxiliary information storage 270, and to process the notification information fields 228a-n and the auxiliary information 234 in order to determine a refined location area 252 in which an oilfield activity has been proposed or is being conducted. The refined location area 252 may also be referred to as a refined oilfield location area.

In some examples, location refinement manager 280 may comprise one or more sub-components which are configured to, in concert, perform the operations required of the location refinement manager 280. In some examples, and as illustrated in FIG. 2B, such sub-components may comprise a notification parser 220, an auxiliary information manager 230 and a location determination manager 250.

For configuration purposes, location refinement manager 280 may, in some examples, receive configuration information 262 from client interaction manager 260. Such configuration information may originate from a client 102 of a user 190, subscriber 195 or administrator 197 and may comprise instructions or parameters that adjust the operation of location refinement manager 280, or may control, guide or constrain which notifications of intent are to be analyzed by it. In some examples, as a result of its operations, location refinement manager 280 may provide information regarding a refined location area 252 for onward communication to a client 102, optionally via client interaction manager 260.

In some embodiments, server 106 may comprise a notification parser 220 configured to retrieve and analyze notification records 222 in order to extract one or more notification information fields 228a-n that are contained within them. The functionality and operation required of notification parser 220 may be at least partly contingent upon the format in which the notification record 222 is stored. By means of example, if notification record 222 is stored in an image format (such as a JPEG representation of a notification of intent published in a newspaper), notification parser 220 may comprise functionality to analyze the image and perform optical character recognition (OCR) in order to convert the image representation of the notification of intent into a textual representation. Conversely, if notification record 222 is stored natively in a textual format, notification parser 220 may not require or invoke such "image-to-text" conversion functionality.

Again, dependent upon the format of the notification record 222, notification parser 220 may or may not require functionality to identify and separate the one or more notification information fields 228a-n from the retrieved notification record 222. By means of example, if a notification record 222 is stored as a composite text string of characters (or if a notification record 222 is stored as an image format which is subsequently converted by notification parser 220 to a composite text string of characters), then notification parser 220 must process and analyze the text string to identify the one or more notification information fields 228a-n. Thus, if the text string comprised the text of the example notification of FIG. 3B, notification parser 220 must comprise functionality to identify and extract the following notification information fields 228 of Table 2 from the text string:

TABLE 2

Notification Information Fields 228 for the example notification of FIG. 3B

| Field: | Notified Information |
|---|---|
| Company Name/Address | Name: Blackbeard Operating, LLC Address: 1751 River Run, Suite 405, Fort Worth, TX 76107 |
| Formation Name | Wichita Albany & Wolfcamp |
| Lease Name | CBone |
| Well Number | 202SD |
| Nearest Town | Monahans, Texas |
| Distance from nearest town | 11.7 miles |
| Direction from nearest town | Northwest |
| Field Name | Keystone South |
| County Name | Winkler |
| Depth interval | 6615 to 8105 feet |

Conversely, if notification record 222 is stored natively in notification storage 210 in a spreadsheet or database format, the notification information fields 228 may already have been separated and notification parser 220 need not comprise or invoke functionality to identify and extract each of these information fields, e.g. from a composite text string.

To identify and extract notification information fields 228a-n from a notification record 222, notification parser 220 may employ any suitable technique such as textual correlation, textual matching, natural language processing, optical character recognition, image processing, and so forth.

Once the notification information fields 228a-n have been identified and extracted, notification parser 220 may, in some embodiments, store these in parsed notification storage 226 as a parsed notification record, for example in a database format or any other suitable format. The notification information fields 228a-n, may store information extracted from the notification record 222 as follows. A company name/address field may store a notified company name and address, a formation name field may store a notified formation name, a lease name field may store a notified lease name, a well number field may store a notified well number, a nearest town field may store a notified place name, a distance from nearest town field may store a notified distance from a place associated with the notified place name, a direction from nearest town field may store a notified approximate direction from a place associated with the notified place name, a field name field may store a notified field name, a county name field may store a notified county name, and a depth interval field may store a notified depth interval. All or some of the information stored in the notification information fields 228a-n may be indicative of a notified oilfield location. Examples of the information stored in each field are shown in Table 2.

In some embodiments, notification parser 220 may comprise additional tools to facilitate, improve or automate the ingestion of information content from notifications of intent or from notification records 222. In some examples, such tools may comprise a web browser extension, add-on or plugin software that allows an administrator 197, user 190 or subscriber 195 to point-to, select or highlight a textual or image-based representation of a notification of intent (such as may be published on an online website) and to request the notification parser 220 to process that representation and extract the information fields contained therein. In some examples such a process is fully automated, in that once the notification parser 220 is directed to the notification of intent of interest, all necessary processing is executed to extract and store the notification information fields 228a-n without further interaction or involvement with the user. In other examples, the process may be partly automated, in that once the notification parser 220 is directed to the notification of intent of interest, a 'pop-up' form is displayed to the user or administrator operating the browser, the form comprising a plurality of notification information fields 228a-n, each of which may or may not be populated with information content. Examples of web browsers are provided in Section A though it shall be appreciated that these constitute only a non-exhaustive sample or subset of all browser software that may be equally compatible with the principles set forth in this disclosure.

FIG. 2C illustrates one example of such a 'pop-up' form 290. In the case that a field is populated, this allows the user or administrator to check the correctness of the automated detection. In the case that the notification parser 220 was not able to detect and populate a field, this allows the user or administrator to manually enter the information into the form (for example by typing the text or by 'dragging and dropping' text from the notification of intent 292), or to conclude that no such field content exists in the notification of intent. In further examples, notification parser 220 may identify a number of potential content values for a notification information field 228a-n and may present these to the user or administrator in order that they may select the one that is most appropriate or accurate (for example via a 'drop-down' menu of possible content values for the field). In yet further examples, notification parser 220 may perform validity checks on the notification information fields 228a-n that have been automatically extracted or which have been manually entered by the user or administrator. By means of example, town names, county names, oilfield field names, formation names, company names and addresses, well numbers and so forth may be cross-checked against a database of known and valid values.

In examples, once the form has been completed to the satisfaction of the user or administrator, the user or administrator may 'submit' the form (for example via a keystroke, mouse click or other Graphical User Interface—GUI—interaction) and the associated notification information fields 228a-n may be stored for example in parsed notification storage 226. In other examples, notification information fields 228a-n may be stored in parsed notification storage 226 without the involvement of a user or administrator, for example once notification parser has self-checked its own automated completion of the form.

It shall be appreciated that while the above examples of the notification parser 220 have been described in the context of operation at or on a server 106, the same principles may be applied to embodiments in which such functionality is provided exclusively on a client 102 or is distributed between a client 102 and a server 106. Thus, in examples, a notification parser 220 may be included within a client 102, wherein the client 102 has access to, or is connected to, notification storage 210. The notification parser 220 on the client 102 may then be configured to extract notification information fields 228a-n from notification records 222, and to upload these to server 106, where, in examples, they may be stored within parsed notification storage 226. In further examples, a notification parser 220 at a client 102 may be configured only to extract a composite text string from a notification record 222 or from an online website publication of a notification of intent, and to upload the composite text string to the server 106 such that the server may then perform operations to extract the notification information fields 228a-n contained therein. In yet further examples, the client 102 may simply "point" a notification parser 220 at the server 106 to a particular notification record 222 of interest (for example via a Uniform Resource Locator—URL, or via other identifying coordinates such as a newspaper name and publication date, a company name, a lease name and so forth), and leave the remainder of the processing to the server 106.

The above principles in which the functionality of notification parser 220 may be comprised within a server 106, within a client 102, or distributed between a server 106 and a client 102, extend also to other components of system 200 such as the aforementioned browser extension, add-on or plugin software that facilitates, improves or automates the ingestion of information content from notifications of intent. Thus, in examples, a browser running on a client 102 may be furnished with an extension, add-on or plugin software that enables the user to identify a notification of intent, for example as published on an online website, and to instruct a notification parser 220 operating on the client 102 to extract one or more notification information fields 228a-n, or to prompt a user to enter such information via a structured form 290. In examples, client 102 may then upload the resulting notification information fields 228a-n to server 106 where they may be stored for example in parsed notification storage 226. In alternative embodiments, the resulting notification information fields 228a-n may not be sent to server 106 and may instead be used for further onward processing at the client 102.

Returning to FIG. 2B, in some embodiments of system 200, server 106 may include an auxiliary information manager 230 which may, in some examples, be configured to receive notification information fields 228a-n and identify and retrieve, from auxiliary information storage 270, auxiliary information 234 that is related to or associated with the notification fields 228a-n. In some examples, auxiliary information manager 230 may subsequently communicate all or part of the retrieved auxiliary information 234 as selected auxiliary information 240 to a location determination manager 250. In examples, auxiliary information 234 may be any information useful for refining a geographical location area in which an oilfield activity has been proposed, such as previously described in the context of FIG. 2A and information storage 150b.

In order to retrieve the auxiliary information 234, auxiliary information manager 230 may send an auxiliary information request 232 to auxiliary information storage 270, and in return may receive the auxiliary information 234.

Auxiliary information manager 230 may determine which auxiliary information to retrieve (and from which auxiliary information storage) based on the presence of one or more notification information fields 228a-a and/or based on the informational content therein. For example, auxiliary information manager 230 may determine that an oilfield name is present within one of the notification information fields 228a-n and may request from an auxiliary information storage 270 local to the server 106 (such as a disk drive connected to or part of a corporate intranet) a geographical polygonal area associated with the oilfield name. In other examples, auxiliary information manager 230 may identify that a county name is included within one of the notification information fields 228a-n and may request from an auxiliary information storage 270 remote from the server 106, such as a publicly-accessible mapping database, a vector of geographical locations that represent the county border of the named county. In yet further examples, auxiliary information manager 230 may identify that a lease name field is present within one of the notification information fields 228a-n and may request from an auxiliary information storage 270 remote from the 106, such as a publicly-accessible or a subscription-based legal information repository, auxiliary information 234 regarding the lessee and/or lessor associated with the named lease. In addition, auxiliary information manager 230 may retrieve further auxiliary information 234, from the same or another auxiliary information storage 270, the information comprising records of land ownership that may be used to identify land owned by the identified lessor. Such information may then be passed to location determination manager 250 for the purposes of assisting with the identification of a refined location at which a proposed oilfield activity associated with the named lease is to take place.

It shall be appreciated that while the above examples intend to illustrate some of the auxiliary information types and informational content that may be retrieved and used by the system 200, these do not preclude application of the system to numerous other auxiliary information types and sources of auxiliary information.

Upon retrieving a potential plurality of auxiliary information 234 associated with a notification record 222, auxiliary information manager 230 may determine that some parts of the information are useful for location determination purposes, while others are not. For example, auxiliary information manager 230 may identify that a well name is included within a notification information field 228a-n and may initiate (via an auxiliary information request 232) an online search for the well name at an auxiliary information storage 270 remote to the server 106, such as a well bore information repository. In response, auxiliary information manager 230 may receive from the well bore information repository a record of the named well but may conclude that no useful location information may be derived from it. As such, auxiliary information manager 230 may determine to omit the retrieved well bore record from the selected auxiliary information 240 that is passed to location determination manager 250.

In some embodiments of system 200, server 106 may include a location determination manager 250, which may in examples be configured to receive a notified approximate location specified within one or more notification information fields 228a-n, and to receive one or more pieces of selected auxiliary information 240, and to process both the notified approximate location and the selected auxiliary information 240 in order to determine a refined location area 252 in which an oilfield activity is proposed to take place or is being conducted.

In some examples, the notified approximate location may be specified within the notification information fields 228a-n as a nearest town name, a distance from the nearest town and an approximate compass direction from the nearest town (such as one of: north, northeast, east, southeast, south, southwest, west and northwest). In examples, location determination manager 250 may then determine a first candidate location area corresponding to the notified approximate direction and may determine at least one second candidate location area based on the selected auxiliary information 240. Location determination manager 250 may then determine a refined location area 252 based on an intersection between the first candidate location area and the second candidate location area. Examples to further illustrate the operation of system 200 in this regard, and in particular, to outline potential applications of location determination manager 250, are provided in the accompanying descriptions of FIGS. 4, 5, 6, 7 and 8.

During operation, server 106 may exchange communications with one or more client devices 102, such as a client of a user 190, subscriber 195, or administrator 197. Inbound communications (to the server 106, from the client 102) may comprise configuration data that is used to configure or control one or more components of the server 106 such as location refinement manager 280. In examples, client interaction manager 260 may process configuration data received from the client 102 and may construct and send appropriate configuration information 262 to location refinement manager 280 in order to effect the control that is desired by the user or administrator. In examples, the configuration data received from the client 102 may identify notifications of intent that are to be analyzed by system 200, or may include settings, parameters, options or other user preferences that are to be taken into account by location refinement manager 280 during the course of its operation. For example, a user 190 may specify, as a percentage value, a distance margin parameter to be used by location refinement manager 280 in determining a first candidate location area based on an inter-arc area (see the description of FIG. 4 for further detail). Such a distance margin parameter may be communicated from the client 102 to the client interaction manager 260 of the server 106, and subsequently relayed by the client interaction manager 260 to location refinement manager 280 within configuration information 262. As a further example, client 102 may specify a county within which location refinement manager 280 is to search for currently active notifications of intent or pending permit applications. Client 102 may send the specified county name to the client interaction manager 260 of server 106, which may then initiate the search via the communication of appropriate configuration information 262 to location refinement manager 280. In yet further examples, a user may configure system 200 such that it will inform or alert the user whenever the system identifies a proposal to conduct an oilfield activity (such as to dispose of saltwater) within an area specified by the user. Such an area may be defined by the user in any suitable manner, such as by specifying a county name, a town name, a location together with a surrounding radius, or any other location area of interest and of potentially arbitrary shape. In such an example, the user's specified area may be sent from a client 102 of the user to client interaction manager 260. Client interaction manager 260 may then monitor any refined location areas 252 that are determined (either routinely or on request) by location refinement manager 280, to identify whether any of these lie within the user specified area, and to notify or alert the user if this is found to be the case. Such a notification or alert may be made in a number of ways, such as by sending a text message to the user's phone, sending an email to the user, leaving an automated voicemail on the user's phone, sending an instant message to the user, sending a notification to an application running on the user's client device 102 and so on.

Client interaction manager 260 may receive information determined by, or produced by, location refinement manager 280, and may handle outbound communication of the determined information to one or more client devices 102. Thus, having determined a refined location area 252 related to a notification of intent, system 200 may comprise functionality to format the information in an appropriate manner and to present or display the information to a user 190, subscriber 195 or administrator 197 of the system. In some examples, formatting of the information may be performed by a component (such as by a client interaction manager 260) of a server 106 of the system 200, and the formatted information may then be communicated to a client device 102 of the user 190, subscriber 195 or administrator 197. In other examples, information describing the refined location area 252 (such as a vector of geographical coordinates forming a perimeter of a polygonal area) may be passed directly to the client 102 and appropriate formatting prior to display or presentation of the information to the user may instead be performed by the client 102 rather than by the server 106. The formatted information may comprise any of text, graphics, icons, images, graphical display instructions or content within any suitable file format or communications protocol. In embodiments, a geographical representation of one or more refined location areas 252 may be displayed, such as superimposed or otherwise overlaid on a map of an oilfield area which may also show additional features such as towns, county borders, oilfield installations or features and so on. In some embodiments, one or more candidate location areas that were used during the determination of the refined location areas 252 (such as described elsewhere in this disclosure with reference to the inter-arc area 420 of FIG. 4, the county border 520 of FIG. 5, the field area 650 of FIG. 6 or the circular area surrounding known well 720 of FIG. 7) may also be displayed overlaid on the map.

In some examples, color formatting, shading or other graphical or textual highlighting may be used to convey further or additional information relating to a refined location area 252 or to an attribute of a notification of intent that is related to the refined location area. For example, a refined location area 252 may be displayed with a particular color or alongside a textual or graphical annotation or icon, wherein the color, annotation or icon is a function of an elapsed time since the notification was published or since a related permit application was made or is a function of a remaining time within which comments or objections to proposals within the notification of intent must be submitted. In further examples, such colors, annotations or icons may be used to convey other information such as to highlight oilfield areas of high or low permit application activity, to indicate a confidence level in the accuracy of the refined location area, to indicate a company associated with a related notification of intent, to indicate a depth of the proposed injection interval, to indicate a field name or area, to convey an association of the notification of intent to a particular lease, lessee or lessor, landowner or mineral rights owner, and so forth.

Client interaction manager 260 may also facilitate dynamic user interaction with location refinement manager 280, in order that the user may retrieve additional detail regarding a displayed refined location area 252. In examples, the dynamic user interaction may be facilitated by providing interactive links or "clickable" areas of the geographical representation of refined location areas 252 in order that a user may select one of these and retrieve additional details such as a publication date of the notification of intent, a proposing company name or address, a lease name, a formation name and so on. System 200 may also assist the user in retrieving, from any available information source, yet further additional information related to the selected notification of intent, such as to display any known geological information regarding the named formation, to retrieve land or mineral rights ownership records, to retrieve historical well completion records, to identify commercial information relating to the named companies and so on. In such a manner, the display of the geographical representation of the refined location areas 252 acts as an interactive "portal" through which a user may explore all known information associated with a notification of intent, such as the land on which the oilfield activity is proposed, related geographical or hydrological features, related oilfield features and installations, related companies and leases, and so forth.

Figure 11:
FIG. 11 illustrates an example of a display of refined oilfield location areas in the U.S. state of Texas.

FIG. 11 shows, by means of an illustrative example, a display of refined location areas 252 relating to published notifications of intent for the U.S. state of Texas. Shaded areas of this grayscale figure show colored regions of the display that highlight the refined location areas 252, based for example on cropped inter-arc areas 420. The county borders are also displayed. Further details and examples regarding the determination of the refined location areas 252 may be found in the descriptions accompanying FIGS. 4, 5, 6, 7, 8 and 9 of the present disclosure.

Returning to FIG. 2B, in embodiments, client interaction manager 260 may also handle any other communications with client 102 related to correct operation of the system, management of the user interface, and forth. For example, client interaction manager 260 may prompt the user for additional information when required, or may present to the user, a set of notifications of intent corresponding to the user's input search criteria, and from which the user may then select one or more that are to be further processed by the system 200 to determine corresponding refined location areas 252. Client interaction manager 260 may also send notifications and alerts of proposed oilfield activity to users, such as those aforementioned which lie within a geographical region of interest specified by the user, or which meet any other notification criteria specified by the user.

FIGS. 3A, 3B, 3C and 3D show published examples of notifications of intent to dispose of oilfield wastewater. These particular examples are taken from newspaper publications in the U.S. state of Texas as are required by law as part of the application process for a permit to dispose of oil and gas waste. In addition, aggregations and reproductions of such legal notices may found at online websites such as at www.texaslegalnotices.com. In each of the examples, a number of notification information fields 228*a-n* may be identified. For example, in FIG. 3A, a company name of "Aqua Terra Permian LLC", a nearest town of "Midland", a distance of 19.8 miles, a direction of "SW" (southwest) and a field name of "Spraberry (Trend Area)" may be identified, amongst others. Such notification information fields 228*a-n* are examples of those that may be identified and extracted by the system 200, such as by notification parser 220.

Figure 4:
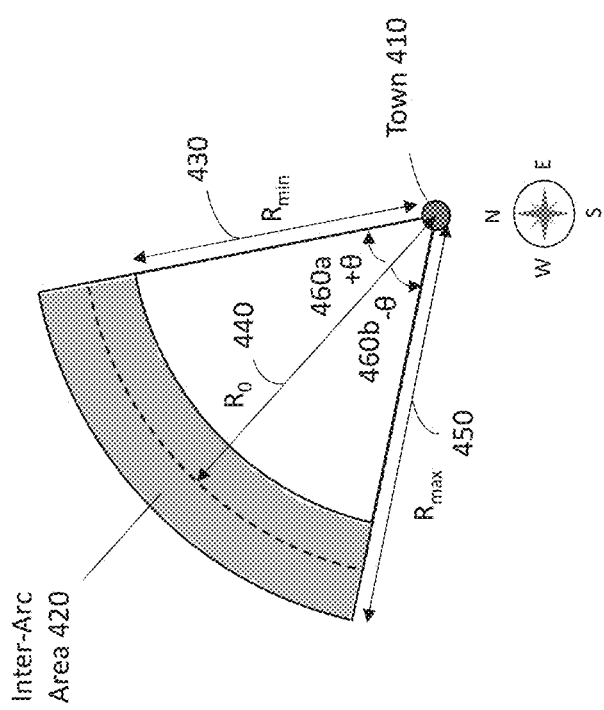
FIG. 4 illustrates a candidate location area determined by an oilfield location refinement system and based on an area between two arcs, according to some embodiments.

FIG. 4 illustrates a candidate location area determined by an oilfield location refinement system and based on an area between two arcs, according to some embodiments.

Referring to FIG. 4 in further detail, a location or place associated with a notified place name is denoted by town 410, such as may be cited within a notification of intent as a "nearest town" to a location of proposed oilfield activity. As previously described, a notification of intent may also indicate a distance from the nearest town and an approximate direction from the nearest town, stored in the notification record 222 as a notified distance and a notified approximate direction. In FIG. 4, the distance from the nearest town is represented as "$R_0$" 440 and the notified approximate direction is shown as the direction in which the arrow denoted 440 is pointing (in this example, in a northwesterly direction). The dotted-line arc of FIG. 4 is centered at the location of town 410 and has a radius equal to $R_0$ 440. The angle spanned by the arc is centered on the notified approximate direction (northwest) plus and minus an angular amount θ (shown as 460*a* and 460*b* in the figure).

In embodiments, a component of system 200, for example a location determination manager 250, may determine, as a first candidate location area for the proposed oilfield activity, an inter-arc area 420 as shown in the example of FIG. 4. As may be observed, the inter-arc area 420 is an area lying between two arcs, each centered at the location of town 410 and each having the same angular spread as the dotted line arc. The larger of the two arcs has a radius $R_{max}$ 450 while the smaller of the two arcs has a radius $R_{min}$ 430. In examples, $R_{max}$ and $R_{min}$ may be determined based on $R_0$ plus and minus a percentage parameter "p" of $R_0$, that is:

$$R_{max}=R_0(1+p/100)$$

$$R_{min}=R_0(1-p/100)$$

More generally however, $R_{max}$ and $R_{min}$ may be determined in any other suitable manner, such as by the addition or subtraction of constant values from R0 or based on more complex linear or non-linear functions of R0. The difference between $R_{max}$ and $R_{min}$ determines the "depth" of the inter-arc area 420 which may be useful to accommodate any potential uncertainty in the distance reported in the notification of intent. For example, while a notification of intent may specify a distance to the nearest town to be 10.3 miles, this may not be precise and a margin or buffer of +/−10% (i.e. p=10) may be appropriate. Use of such a percentage-based margin leads to smaller buffer zones (and hence potentially higher location accuracy) when closer to towns, and larger buffer zones when further away from towns.

In the example of FIG. 4, the angular spread of the arcs is symmetrical about the notified approximate direction and is equal to 2θ. The value of θ may be chosen based on the uncertainty in the notified approximate direction. For example, it is common in notifications of intent published in Texas to specify the direction to only the nearest 45° point of the compass (for example, North, Northeast, East, Southeast and so on). This leads to a corresponding uncertainty in the notified approximate direction of +/−22.5°. There is also some risk that the notifying party is not overly accurate in its quantization of the actual direction to one of the 45° points of the compass. Thus, while in the present example, a value of θ=22.5° should in-theory be sufficient, it may be prudent to utilize a larger value such as θ=30° in order to accommodate this type of additional inaccuracy or error that may be present in the notification. In embodiments, a value of θ between 22.5° and 30° may be selected; in further embodiments, a value of θ between 22.5° and 45° may be selected. In still further embodiments, the θ may be set at any value between 1° and 90°, depending on the precision of the directions specified in the notice of intent. Greater precision may lead to the use of a smaller values for θ.

Figure 5:
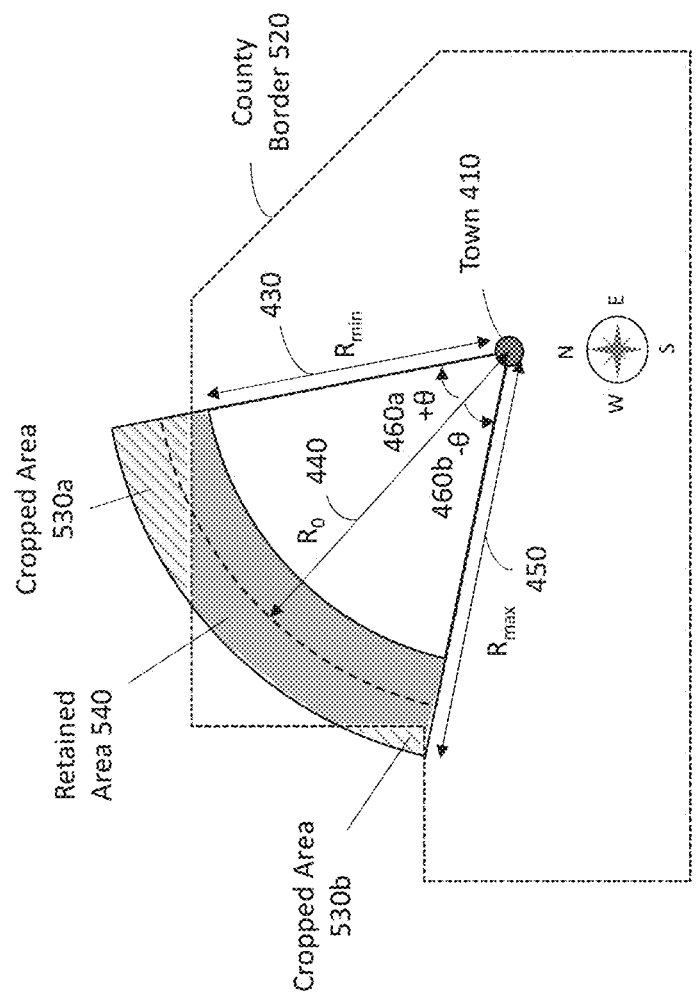
FIG. 5 illustrates a candidate location area determined by an oilfield location refinement system and based in-part on a county border, according to some embodiments.

FIG. 5 illustrates a candidate location area determined by an oilfield location refinement system and based in-part on a county border, according to some embodiments. FIG. 5 is an extension of the example of FIG. 4, and items 410, 420, 430, 440, 450, 460*a* and 460*b* remain the same as previously described in FIG. 4.

In further detail, FIG. 5 extends the example of FIG. 4 (in which an inter-arc area 420 is determined as a first candidate location area), to accommodate additional auxiliary information 234 relating to the locations of a county border 520. In examples, such additional auxiliary information 234 may be retrieved by an auxiliary information manager 230 based upon an identified county name within notification information fields 228a-n. In embodiments, a location determination manager 250 may utilize the auxiliary information on the county border 520 to define a second candidate location area, this being the area enclosed by the county border 520. Location determination manager 250 may then identify a refined location area 252 based on an intersection of the inter-arc area 420 (first candidate location area) and the county area enclosed by county border 520 (second candidate location area). Thus, in the example of FIG. 5, only a portion of the inter-arc area 420 is retained, labelled as retained area 540, to constitute the refined location area 252. The remaining portions of the inter-arc area 420 are discarded or "cropped" (labelled in FIG. 5 as cropped areas 530a and 530b) as these do not lie within the area defined by county border 520.

Figure 6:
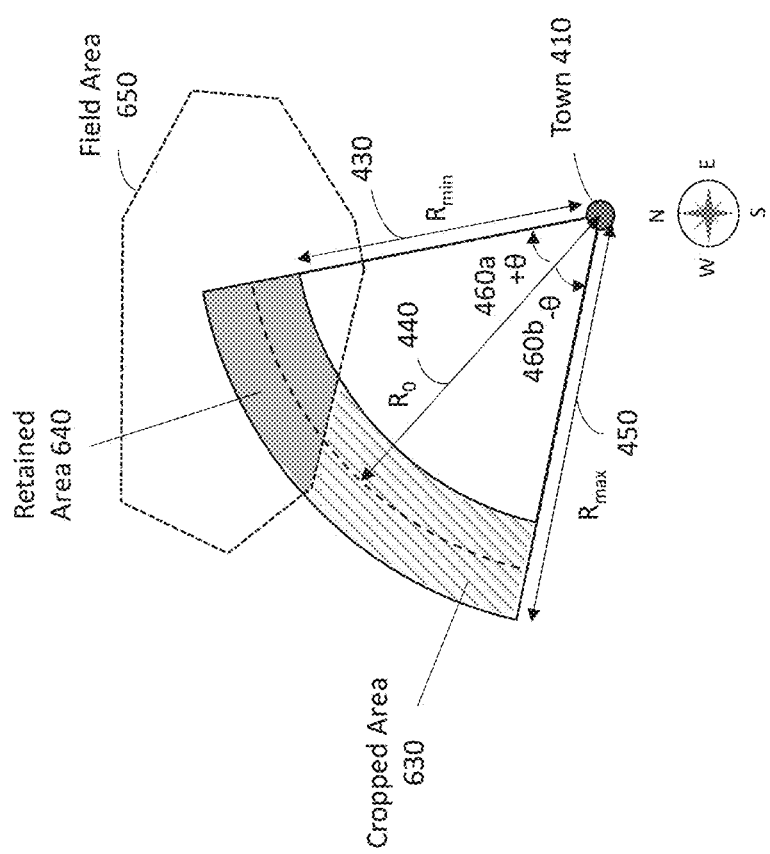
FIG. 6 illustrates a candidate location area determined by an oilfield location refinement system and based in-part on a field area, according to some embodiments.

FIG. 6 illustrates a candidate location area determined by an oilfield location refinement system and based in-part on a field area, according to some embodiments. FIG. 6 is an extension of the example of FIG. 4, and items 410, 420, 430, 440, 450, 460a and 460b remain the same as previously described in FIG. 4.

In further detail, FIG. 6 extends the example of FIG. 4 (in which an inter-arc area 420 is determined as a first candidate location area), to accommodate additional auxiliary information 234 relating to the boundaries of an oilfield field area 650. In examples, such additional auxiliary information 234 may be retrieved by an auxiliary information manager 230 based upon an identified field name within notification information fields 228a-n. In embodiments, a location determination manager 250 may utilize the auxiliary information on the field area 650 to define a second candidate location area. Location determination manager 250 may then identify a refined location area 252 based on an intersection of the inter-arc area 420 (first candidate location area) and the field area 650 (second candidate location area). Thus, in the example of FIG. 6, only a portion of the inter-arc area 420 is retained, labelled as retained area 640, to constitute the refined location area 252. The remaining portion of the inter-arc area 420 is discarded or "cropped" (labelled in FIG. 6 as cropped area 630) as this does not lie within field area 650.

In some examples, a plurality of defined field areas 650 (one for each of a corresponding plurality of field names) may be known a-priori to system 200 and stored within auxiliary information storage 270. In general, however, the boundaries of oilfield fields is not an exact science and there is no current definitive or accessible source of information that defines them. As such, in examples, system 200 may also be configured to autonomously determine field boundaries by processing the locations and field names of a plurality of known wells. Such processing is further described within this disclosure in the context of FIG. 9.

Figure 7:
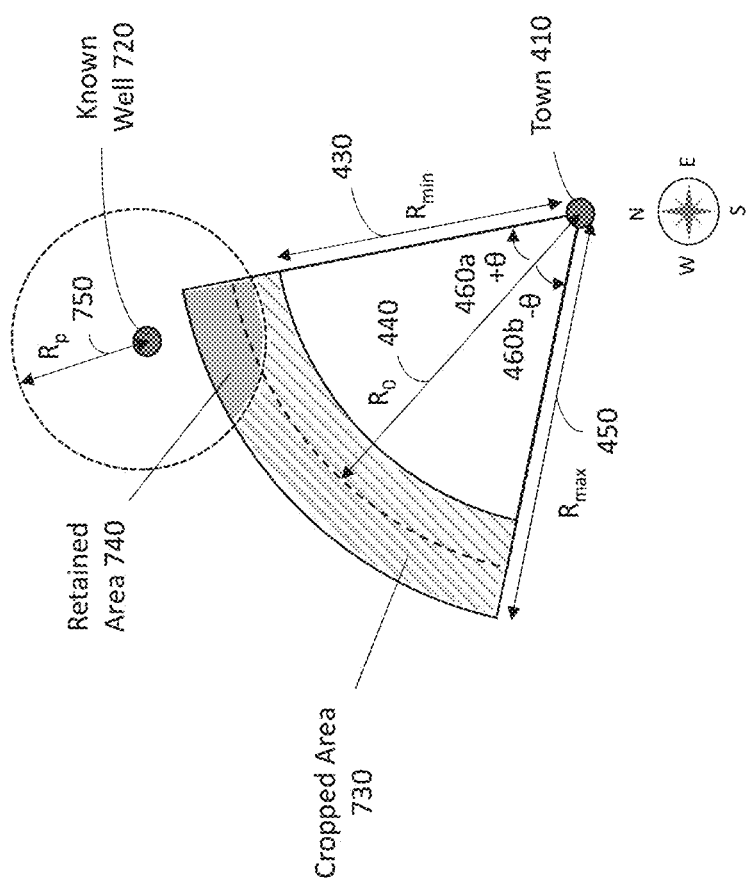
FIG. 7 illustrates a candidate location area determined by an oilfield location refinement system and based in-part on a proximity to a known well, according to some embodiments.

FIG. 7 illustrates a candidate location area determined by an oilfield location refinement system and based in-part on a proximity to a known well, according to some embodiments. FIG. 7 is an extension of the example of FIG. 4, and items 410, 420, 430, 440, 450, 460a and 460b remain the same as previously described in FIG. 4.

Disposal wells may often be located within a certain distance of existing wells, such as producing wells, in order that distances and costs associated with vehicular or pipeline-based transportation of wastewater from the producing well can be minimized. A statistical analysis of the distances between producing wells and disposal wells at which wastewater from the producing wells is ultimately disposed of, may be used by system 200 to provide insight into water transportation distances that are commonly encountered, and distances that are uncommon. For example, a cumulative distribution function (CDF) of distances between producing wells and their sites of disposal (i.e. the wastewater transportation distance) may be constructed using known information on existing producing and disposal wells. A distance may then be determined that corresponds to a given percentile of the CDF. For example, it may be determined that in a given oil producing region (country, state, county, basin, field and so forth), C=95% of disposal wells are located within $D_C$=4 miles of the producing wells from which they accept wastewater. Knowledge of such a statistical distribution may then be used by system 200 to further refine an estimated location at which a new disposal well is proposed. Different statistical distributions may be collected and used for different oilfield regions in order to tailor the location refinement algorithm to a particular region. Additionally, different confidence levels "C" may be selected, these also affecting the CDF distances "$D_C$" that are obtained.

In further detail, FIG. 7 extends the example of FIG. 4 (in which an inter-arc area 420 is determined as a first candidate location area), to accommodate additional auxiliary information 234 relating to the locations of known wells 720 that may be situated in close proximity to the proposed oilfield activity or proposed new disposal well. The auxiliary information 234 may for example, comprise information retrieved from a database of known wells (this being one example of auxiliary information storage 270). In FIG. 7, a known well 720 is shown, around which a circular area bounded by a dotted line is drawn with radius $R_p$ 750. In examples, radius $R_p$ may be selected based upon a distance "$D_C$" obtained from a CDF of distances at a given confidence level "C" as described above. While a circular region is shown around the known well 720 in FIG. 7, this is illustrative only and any other shaped region around a known well 720 may be used.

In general, any one or more known wells 720 may be identified and used by system 200 to determine regions surrounding these in which there is an increased likelihood of a proposed new disposal well being situated. However, in some embodiments, system 200 may also take into account other known information, such as within notification information fields 228a-n, to help identify potential producing wells of relevance and which should be included within the location refinement algorithm. For example, an auxiliary information manager 230 may retrieve information on the locations of known wells based upon an identified field name, formation name, well name or ID, county name, company or operator name, or any other information field that may be indicative of which known or existing wells may be related to the proposed oilfield activity or new disposal well. Thus, in examples, system 200 may consider only those known producing wells that are owned-by, operated-by or have an existing commercial relationship-to the same company that is identified within the notification of intent for operation of a new disposal well. In other examples, system 200 may consider only those known producing wells that are associated with the field listed on the notification of intent, and so on.

In embodiments, a location determination manager 250 may utilize the auxiliary information on the locations of known wells 720 to define a second candidate location area, this corresponding to the dotted circular region in the example of FIG. 7 with radius $R_p$ 750. Location determination manager 250 may then identify a refined location area 252 based on an intersection of the inter-arc area 420 (first candidate location area) and the second candidate location area. Thus, in the example of FIG. 7, only a portion of the inter-arc area 420 is retained, labelled as retained area 740, to constitute the refined location area 252. The remaining portion of the inter-arc area 420 is discarded or "cropped" (labelled in FIG. 7 as cropped area 730) as this does not lie within a distance $R_p$ 750 of known well 720. Although FIG. 7 illustrates a single known well 720, it is understood that multiple known wells 720 may be used in this analysis. Using multiple known wells 720 may produce a discontinuous refined location area 252 if, for example, the boundary regions of the known wells 720 used in the analysis do not overlap within the inter-arc area 420.

Figure 8:
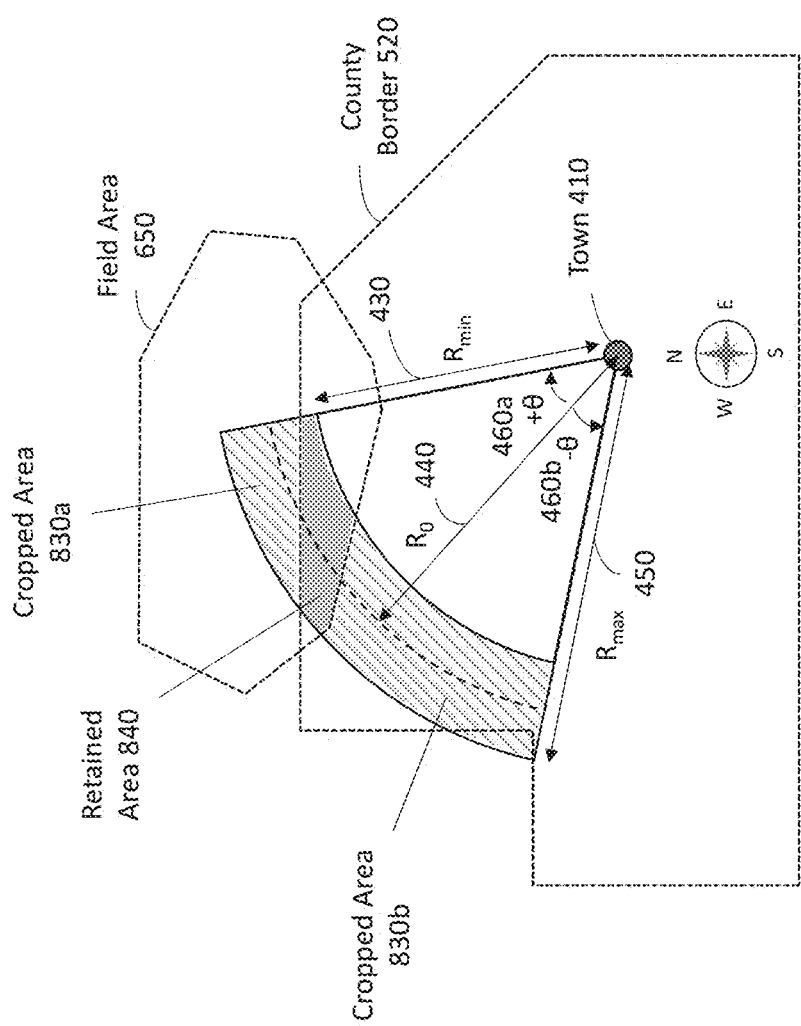
FIG. 8 illustrates a candidate location area determined by an oilfield location refinement system and based in-part on a county border and a field area, according to some embodiments.

FIG. 8 illustrates a candidate location area determined by an oilfield location refinement system and based in-part on a county border 520 and a field area 650, according to some embodiments. FIG. 8 is an extension of the examples of FIGS. 4, 5 and 6, and items 410, 420, 430, 440, 450, 460a, 460b, 520 and 650 remain the same as previously described.

While FIG. 5 illustrates the principle of determining a refined location area 252 based upon cropping of an inter-arc area 420 by a county border 520, and FIG. 6 illustrates the principle of determining a refined location area 252 based upon cropping of an inter-arc area 420 and a field area 650, it shall be appreciated that in general, such principles may be combined and hence a multitude of different candidate location areas may be used to determine a refined location area 252. One such possibility is illustrated in FIG. 8 in which both the county border 520 and the field area 650 are used to crop the inter-arc area 420, in order to determine a location of proposed oilfield activity with improved accuracy. Thus, in FIG. 8, portions of the inter-arc area 420 are removed (labelled cropped areas 830a and 830b), as these do not lie within both the county border 520 and the field area 650. Retained area 840 is not cropped as it does lie within the intersection of the county border 520 and the field area 650 and this may therefore be reported (for example by location determination manager 250) as a refined location area 252. While county borders 520 and field areas 650 are described in this particular example, it shall be appreciated that the same principles extend to multiple candidate location areas as may be determined based upon a diversity of auxiliary information types. Thus, in examples of system 200, a refined location area 252 may be based on an intersection of any number or type of candidate location areas, such as an inter-arc area, a field area, an area enclosed by a county border, a proximity to a known well, a geological formation area, an area relating to an underground hydrological structure, the locations of pipeline or other water transportation infrastructure, areas relating to the ownership of land or mineral rights by a given person or commercial entity, and so on.

Figure 9:
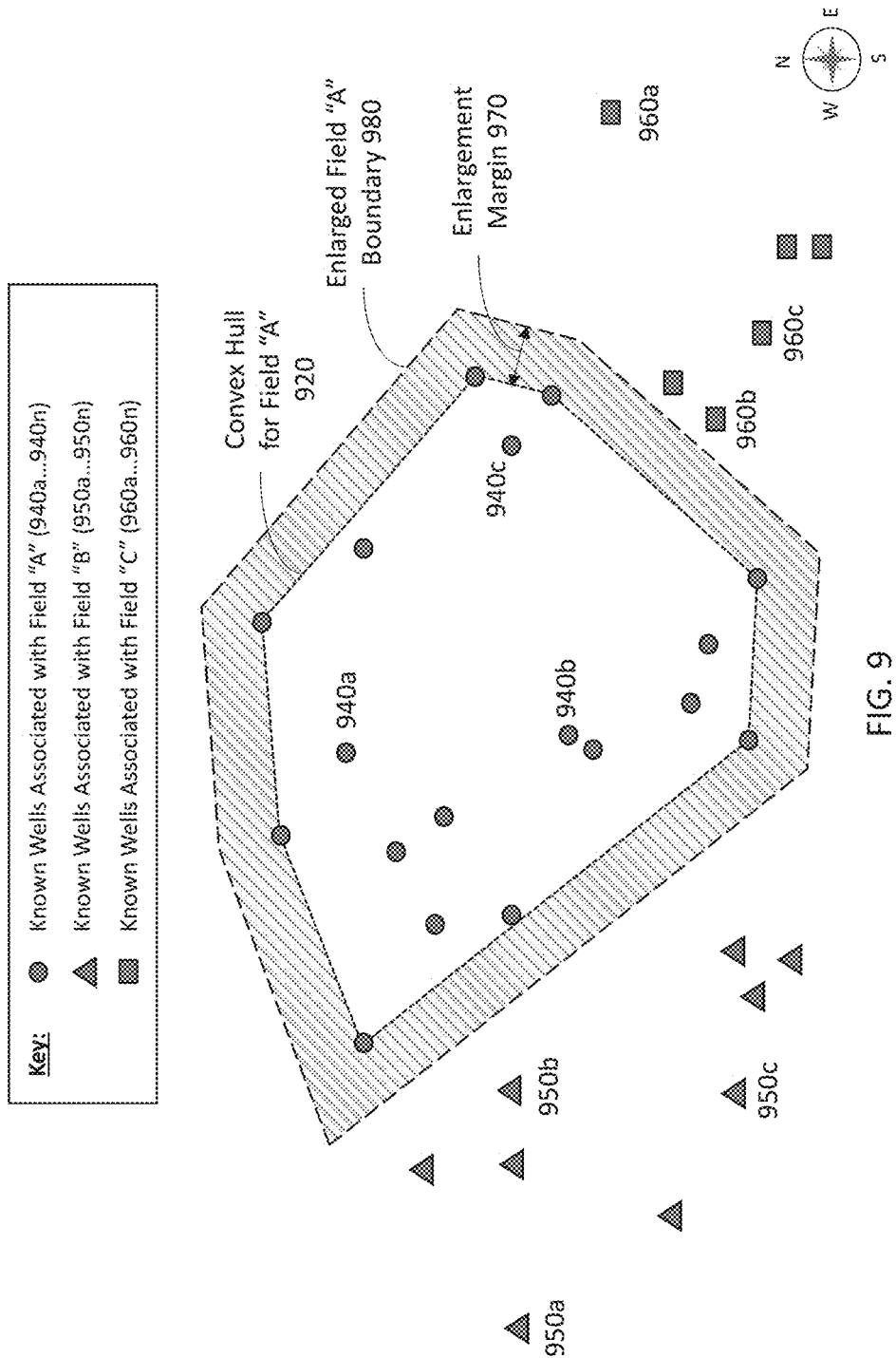
FIG. 9 illustrates an oilfield field area determined by an oilfield location refinement system and based on a convex hull, according to some embodiments.

FIG. 9 illustrates an oilfield field area determined by an oilfield location refinement system and based on a convex hull, according to some embodiments.

Field names are often referenced by legal documentation (including notifications of intent) and are usually unique within a state. As previously described however, the boundaries of oilfield fields is not an exact science and there is no current definitive or accessible source of information that defines them. As such, in examples, system 200 may be configured to autonomously determine field boundaries. In embodiments, such processing may be based on a database comprising the locations and field names of a plurality of known wells.

In many jurisdictions, records exist of most, if not all, oil and gas wells ever drilled, at least for more recent times in which the monitoring and regulation of oilfield activity has increased. Such records may take the form of granted permits, completion records and so forth. In examples, such as in the case of the United States of America, wells may be identified by a unique 10-digit "API" (American Petroleum Institute) number which is a unique, permanent, numeric identifier assigned for identification purposes to a wellbore. The first 2 digits of the API number are the state code, the next 3 digits are the county code and the last 5 digits are the unique number assigned to identify the wellbore. In cases wherein the locations and field names of known wellbores are recorded (and may be referenced by means of a unique wellbore identifier such as the API number), this information may be used by system 200 to determine a polygonal area of a field.

In embodiments, auxiliary information manager 230 may retrieve from an auxiliary information storage 270, a database of known wellbore records comprising for each wellbore, a location and a field name. In the illustrative example of FIG. 9, the locations of one such plurality of wellbores are shown in which those associated with "Field A" are denoted by circles (940a-n), those associated with "Field B" are denoted by triangles (950a-n) and those associated with "Field C" are denoted by squares (960a-n). In examples, a component of system 200 (such as an auxiliary information manager 230) may identify a subgroup of the known wellbores that are associated with a particular field name and may process their known locations to determine a polygonal area associated with that particular field. In examples, such processing may be based on a "convex-hull" algorithm. In the example of FIG. 9, polygon 920 defines the convex hull of the locations of known wellbores associated with Field A (940a, 940b, 940c, . . . 940n).

A convex hull is a polygon defined by vertices that are the minimal set of points from a set "X" that encompass "X". By means of an analogy, a convex hull is a polygon shape that would result if a rubber band was 'stretched around' the points in "X". A number of different computational algorithms may be used to determine a convex hull. For example, a "Graham Scan" (published by Ronald Graham in 1972) performs an iterative search over a sorted set of points in "X" to determine a perimeter path where at each corner, the direction of turn is always the same (i.e. always left if proceeding in an anticlockwise direction, or always right if clockwise). In another example, a "Jarvis March" or "Gift Wrapping" algorithm (published by R. A. Jarvis in 1973) achieves similar by starting with a point at one extremity of the set "X" and iteratively finding another point in the set that has the largest "interior angle" with respect to a line defined by the current point and the previous point, until the perimeter is defined.

By processing the locations of known wellbores, for example through use of a suitable convex hull algorithm, system 200 may define a field area boundary associated with a field name. The field area may subsequently be used (for example by a location determination manager 250 in a process similar to that described with respect to FIGS. 6 and 8) to determine a refined location area 252 for a proposed or existing oilfield activity such as the drilling of a new (and as-yet unknown) wellbore for saltwater disposal purposes.

In some examples, system 200 may determine the field area directly in accordance with the determined convex hull polygon 920. However, to accommodate some margin of error, system 200 may, in examples, determine the field area based on an enlargement of the determined convex hull 980.

In the example of FIG. 9, an enlargement margin 970 is used to expand the convex hull polygon for "Field A" 920 in directions away from its centroid, to produce the enlarged Field A boundary 980. In general, however, such an enlargement may be performed in any suitable manner.

Subsequent to determining a field area using the locations of known well sites (such as via application of the convex hull algorithm as described above), system 200 may store the resulting polygonal field areas within a suitable storage (such as within an auxiliary information storage 270) for use in subsequent operations. This avoids the need to recalculate the field areas each time they are required.

Figure 10:
FIG. 10 illustrates an example of a method for determining a refined oilfield location from a notified oilfield location, according to some embodiments.

FIG. 10 illustrates an example of a method 1000 for determining a refined oilfield location from a notified oilfield location, according to some embodiments.

Any of the steps of method 100 may be performed by any component, functional entity or software of an online platform 180, a server 106, a client 102, or a combination thereof.

In a first step 1010 of method 1000, the method includes obtaining, from a notification of intent, a notified oilfield location record comprising a notified place name, a notified distance from a place associated with the notified place name and a notified approximate direction from the place associated with the notified place name. In examples, information associated with the notification of intent may be stored as a notification record 222 within a notification storage 210 and may be obtained by or requested by another component of system 200 (such as by a notification parser 220). In order to do so, the component may send a notification request 224 to the notification storage 210. In examples, the notification record 222 may comprise a representation of a notification of intent to conduct an oilfield activity. In examples, and as previously described with reference to FIG. 2B, the representation may be in any suitable format, including text, one or more images, or file formats suitable for document viewing, word processing, database or spreadsheet-based software applications. In examples, the representation may have already been subdivided into multiple constituent notification information fields 228a-n. In other examples, the representation may be in a "composite" format (such as an image or a text string) from which the constituent notification information fields 228a-n may be extracted.

In a second step 1020 of method 1000, an angular range is determined based upon the notified approximate direction. In examples, and as previously described with reference to FIG. 4, the notified approximate direction may be a compass point such as one of North, Northeast, East, Southeast, South, Southwest, West and Northwest and the angular range may be determined as the notified approximate direction plus and minus an angle θ (shown as items 460a and 460b in FIG. 4).

In a third step 1030 of method 1000, a distance range is determined based on the notified distance. In examples, and as previously described with reference to FIG. 4, a minimum of the distance range $R_{min}$ may correspond to the notified distance $R_O$ 440 minus a first distance and a maximum of the distance range $R_{max}$ may correspond to the notified distance $R_O$ 440 plus a second value. In embodiments, the first and second values may be determined as a percentage "P" of the notified distance $R_O$ 440 or may be constant values that are not a function of $R_O$ 440. In further embodiments, the first and second values may be more complex linear or non-linear functions of the notified distance $R_O$.

In a fourth step 1040 of method 1000, a first candidate location area is determined based on both the angular range and on the distance range. In examples, and as previously described with reference to FIG. 4, the first candidate location area may be an inter-arc area 420 lying between first and second arcs of radius $R_{min}$ 430 and $R_{max}$ 450 respectively, both arcs centered at the place associated with the notified place name 410 and both arcs spanning the same angular range as was determined in step 1020.

In a fifth step 1050, method 1000 includes obtaining auxiliary information associated with information identified within the notification of intent. In examples, and as described throughout this disclosure, the auxiliary information may comprise any of (but is not limited to): information on one or more existing oilfield wells or drilling sites, information on a developing oilfield site, information on an installation of oilfield infrastructure or equipment, a location of a country border, state border, or county border, information on a named oilfield field area, information on a geological formation or structure, information on a hydrological structure, information on oilfield land, information on an ownership of oilfield infrastructure or land, information on an oilfield lease, historical records of oilfield activity, commercial or contractual relationships between oilfield companies and so forth. In examples, the auxiliary information 234 may be obtained from any suitable auxiliary information storage 270 by an auxiliary information manager 230. Auxiliary information may be any information useful for refining a location area within which an oilfield activity is proposed to take place, such as the construction of a new saltwater disposal well or the modification of an existing well. Examples of some of the types of auxiliary information 234 useful for such purposes have been previously described with reference to at least FIGS. 2A, 2B, 5, 6, 7, 8 and 9, and elsewhere throughout this disclosure.

In a sixth step 1060, method 1000 includes determining a second candidate location area based on the auxiliary information. In some examples, and as previously described with reference to FIGS. 5, 6 and 7, the second candidate location area may be an area enclosed by a county border 520, a field area 650, or an area in close proximity to a known well 720. It shall be appreciated however that these serve as illustrative examples only and that the second candidate location area may, in general, be based upon any of a diversity of auxiliary information types relating to oilfield features, geological features, hydrological features, geographical features, oilfield topology, oilfield installations, land ownership information, mineral rights ownership information, commercial and contractual information, historical records of oilfield activity and so forth.

In a seventh step 1070, method 1000 includes determining a refined oilfield location area based on an intersection of the first candidate location area and the second candidate location area. In examples, the refined location area 252 (one in which an oilfield activity is proposed to take place) may be determined by a location determination manager 250 and passed to a client interaction manager 260 for appropriate formatting of the information content and onward communication to a client 102. Illustrative examples of the determination of a refined location area 252 based on an intersection of a first candidate location area and a second candidate location area may be found for example with reference to FIGS. 5, 6, 7 and 8 and the accompanying descriptions. Also as previously described, a further-refined location area 252 may be determined based on the intersection of three or more candidate location areas, each potentially based on different information within a notification of intent and/or on different auxiliary information types.

The preceding descriptions illustrate embodiments of system 200 and examples of the distribution of functionality between its components, such as a server 106 and a client 102. By means of example, FIG. 2B illustrates an embodiment in which the components of location refinement manager 280 reside within a server 106. It shall be appreciated however that various different embodiments of system 200 are possible in any part of or all of the functionality of a component of system 200, such as a location refinement manager 280, is not located within a server 106, but is instead located within a client 102 or is distributed between a server 106 and a client 102.

The above systems, devices, methods, processes, and the like may be realized in hardware, software, or any suitable combination of these. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A computer-implemented method for determining a refined oilfield location area from a notified oilfield location, the method comprising:
    obtaining, by one or more processors, from a notification of intent stored in an information storage device, a notified oilfield location record comprising a notified place name, a notified distance from a place associated with the notified place name, a named oilfield, and a notified approximate direction from the place associated with the notified place name;
    determining, by the one or more processors, an angular range based on the notified approximate direction;
    determining, by the one or more processors, a distance range based on the notified distance;
    determining, by the one or more processors, a first candidate location area based on both the angular range and on the distance range;
    obtaining, by the one or more processors, auxiliary information associated with information identified within the notification of intent, the auxiliary information including at least a plurality of known well site locations;
    identifying, by the one or more processors, a subgroup of the plurality of known well site locations, the subgroup comprising known well site locations associated with the named oilfield;
    determining, by the one or more processors, a polygonal area associated with the named oilfield and encompassing the known well site locations of the subgroup,
    determining, by the one or more processors, a second candidate location area based at least on the polygonal area associated with the named oilfield;

determining, by the one or more processors, the refined oilfield location area based on an intersection of the first candidate location area and the second candidate location area; and causing, by the one or more processors, output of the refined oilfield location area to a client device.

2. The computer-implemented method of claim 1, further comprising determining locations within the first candidate location area that lie between a line of a first circular arc over the angular range and a line of a second circular arc over the angular range, wherein the first circular arc has a first radius equal to a minimum of the distance range and the second circular arc has a second radius equal to a maximum of the distance range.

3. The computer-implemented method of claim 2, further comprising determining the maximum of the distance range as a product of the notified distance and a first constant greater than one, and determining the minimum of the distance range as a product of the notified distance and a second constant less than one.

4. The computer-implemented method of claim 2, further comprising determining a minimum of the angular range as equal to the notified approximate direction minus half of an angular spread and determining a maximum of the angular range as equal to the notified approximate direction plus half of the angular spread.

5. The computer-implemented method of claim 1 wherein:
the auxiliary information further comprises locations of a county border;
the method further comprises determining a third candidate location area as an area defined and enclosed by the county border, and
determining the refined oilfield location area is based on an intersection of the first candidate location area, the second candidate location area and the third candidate location area.

6. The computer-implemented method of claim 1 wherein:
the auxiliary information further comprises a location of a known well site;
the method further comprises determining a third candidate location area as a circular region with a predetermined radius centered at the location of the known well site, and
determining the refined oilfield location area is based on an intersection of the first candidate location area, the second candidate location area and the third candidate location area.

7. The computer-implemented method of claim 6 further comprising determining the predetermined radius based on a statistical analysis of a plurality of distances between locations of known producing well sites and locations of disposal wells at which oilfield water from the known producing well sites is disposed.

8. The computer-implemented method of claim 1 wherein the polygonal area is determined according to a convex hull of the known well site locations of the subgroup.

9. The computer-implemented method of claim 1 wherein the auxiliary information further comprises information on one or more of:
a location of a country border, state border or county border;
a location of an existing well or drilling site;
a location of a named oilfield area;
a location of an oilfield feature or of oilfield infrastructure;
a geological or hydrological formation;
an ownership of land or an entitlement to mineral rights;
an oilfield lease;
commercial or contractual relationships;
historical records of oilfield activity.

10. The computer-implemented method of claim 1 further comprising generating a geographical representation of one or more of:
the first candidate location area;
the second candidate location area;
the refined oilfield location area.

11. The computer-implemented method of claim 10 further comprising:
determining additional information associated with the notification of intent;
generating a textual or graphical indication of the additional information; and
displaying the textual or graphical indication together with the geographical representation.

12. The method of claim 11 wherein the additional information comprises one or more of:
an elapsed time or a remaining time associated with the notification of intent;
a level of oilfield permit application activity;
a confidence level associated with an accuracy of the refined oilfield location area;
a company associated with the notification of intent;
an oilfield field name or oilfield area;
a depth of a proposed injection interval;
a lease name;
a landowner or mineral rights owner.

13. The computer-implemented method of claim 11 wherein the textual or graphical indication of the additional information comprises one or more of:
a color of the first candidate location area, the second candidate location area or the refined oilfield location area;
a textual annotation associated with the first candidate location area, the second candidate location area or the refined oilfield location area;
a graphical annotation associated with the first candidate location area, the second candidate location area or the refined oilfield location area.

14. The computer-implemented method of claim 1 further comprising:
receiving a textual or image-based representation of the notification of intent; and
processing the textual or image-based representation of the notification of intent to identify one or more information fields.

15. The computer-implemented method of claim 14 further comprising receiving the textual or image-based representation of the notification of intent or a Uniform Resource Locator pointing to the textual or image-based representation of the notification of intent from a web browser extension software component.

16. A system for determining a refined oilfield location area from a notified oilfield location, the system comprising:
a non-transitory computer readable memory unit;
at least one processor configured to execute computer instructions to:
obtain, from a notification of intent stored in an information storage device, a notified oilfield location record comprising a notified place name, a named oilfield, a notified distance from a place associated with the notified place name and a notified approximate direction from the place associated with the notified place name;
determine an angular range based on the notified approximate direction;
determine a distance range based on the notified distance;
determine a first candidate location area based on both the angular range and the distance range;
obtain auxiliary information associated with information identified within the notification of intent, the auxiliary information including at least a plurality of known well site locations;
identify a subgroup of the plurality of known well site locations, the subgroup comprising known well site locations associated with the named oilfield;
determine a polygonal area associated with the named oilfield and encompassing the known well site locations of the subgroup,
determine a second candidate location area based at least on the polygonal area associated with the named oilfield;
determine the refined oilfield location area based on an intersection of the first candidate location area and the second candidate location area; and
cause output of the refined oilfield location area to a client device.

17. A non-transitory computer readable medium storing computer instructions that, when executed by one or more processors, cause the one or more processors to carry out a method for determining a refined oilfield location area from a notified oilfield location, the method comprising:
obtaining, by the one or more processors, from a notification of intent, a notified oilfield location record comprising a notified place name, a named oilfield, a notified distance from a place associated with the notified place name and a notified approximate direction from the place associated with the notified place name;
determining, by the one or more processors, an angular range based on the notified approximate direction;
determining, by the one or more processors, a distance range based on the notified distance;
determining, by the one or more processors, a first candidate location area based on both the angular range and on the distance range;
obtaining, by the one or more processors, auxiliary information associated with information identified within the notification of intent, the auxiliary information including at least a plurality of known well site locations;
identifying, by the one or more processors, a subgroup of the plurality of known well site locations, the subgroup comprising the plurality of known well site locations associated with the named oilfield;
determining, by the one or more processors, a polygonal area associated with the named oilfield and encompassing the plurality of known well site locations of the subgroup,
determining, by the one or more processors, a second candidate location area based at least on the polygonal area associated with the named oilfield;
determining, by the one or more processors, the refined oilfield location area based on an intersection of the first candidate location area and the second candidate location area; and
causing, by the one or more processors, output of the refined oilfield location area to a client device.

* * * * *